(12) United States Patent
Deshpande et al.

(10) Patent No.: US 12,112,292 B2
(45) Date of Patent: Oct. 8, 2024

(54) LOCATION RECONCILIATION BASED ON MULTIPLE COMPUTING DEVICE SIGNALS

(71) Applicant: Uber Technologies, Inc., San Francisco, CA (US)

(72) Inventors: Ajinkya Manoj Deshpande, San Jose, CA (US); Mudit Gupta, Berkeley, CA (US); Siddharth Rane, Lynnwood, WA (US); Martin Alan Tromblee, Camas, WA (US); Jianing Wang, Fremont, CA (US); Yu Wang, San Francisco, CA (US); David Wee, El Sobrante, CA (US); Cheng Wei, Fremont, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 4 days.

(21) Appl. No.: 17/976,286

(22) Filed: Oct. 28, 2022

(65) Prior Publication Data

US 2024/0144160 A1  May 2, 2024

(51) Int. Cl.
*G06Q 10/0833* (2023.01)
*H04W 64/00* (2009.01)

(52) U.S. Cl.
CPC ...... *G06Q 10/0833* (2013.01); *H04W 64/006* (2013.01)

(58) Field of Classification Search
CPC .................. G06Q 10/0833; H04W 64/006
See application file for complete search history.

(56) References Cited

U.S. PATENT DOCUMENTS 10,621,540 B1 *  4/2020  Huddar ................. G06Q 30/018
11,829,909 B2 * 11/2023  Wernze ............... G06Q 30/0635
11,830,366 B2 * 11/2023  Ren ....................... B60W 50/12
11,856,409 B2 * 12/2023  Fong ..................... H04W 12/082
2015/0339624 A1 * 11/2015  Lozito ................. G06Q 10/0833
705/333
2016/0071055 A1 *  3/2016  Beckwitt ............. G06Q 20/145
705/334

(Continued)

FOREIGN PATENT DOCUMENTS

WO    WO-2019039758 A1 *  2/2019

OTHER PUBLICATIONS

P. W. Modica, M. P. Loria, M. Toja, V. Carchiolo and M. Malgeri, "A Geofencing Algorithm Fit for Supply Chain Management," 2018 Federated Conference on Computer Science and Information Systems (FedCSIS), Poznan, Poland, 2018, pp. 737-746. (Year: 2018).*

*Primary Examiner* — Resha Desai
*Assistant Examiner* — Danielle Elizabeth Zevitz
(74) *Attorney, Agent, or Firm* — Dority & Manning, P.A.

(57) ABSTRACT

Systems and methods for reconciling location based on multiple computing device signals. For example, the computing system can obtain location datasets associated with freight carrier services from computing sources. The computing system can determine an expected signal pattern for a location associated with a freight transportation service. The computing system can determine, for each computing source, a confidence score. The confidence score can represent the probability that the respective location dataset is associated with a load being transported for a freight transportation service. The computing system can determine a primary location dataset based on the confidence scores. The computing system can perform actions based on the primary location dataset.

20 Claims, 15 Drawing Sheets

(56) References Cited

U.S. PATENT DOCUMENTS

2020/0410440 A1* 12/2020 Hickey .............. G06Q 10/0833
2021/0293555 A1*  9/2021 Roherty ............. G01C 21/3697
2021/0334650 A1* 10/2021 Celano .................... G08G 3/00
2022/0051183 A1*  2/2022 Franzo ............. G06Q 10/06398
2022/0327482 A1* 10/2022 Meanor ................ G06F 18/214

* cited by examiner

| CONFIDENCE SCORES ||
|---|---|
| TIME SOURCE | CONFIDENCE SCORE (MAX 100) |
| SOURCE | 65 |
| SOURCE | 85 |
| SOURCE | 95 |
| SOURCE | 50 |

840

820 — SOURCE 65
825 — SOURCE 85
830 — SOURCE 95
835 — SOURCE 50

FIG. 8B

LOCATION RECONCILIATION BASED ON MULTIPLE COMPUTING DEVICE SIGNALS

FIELD

The present disclosure relates generally to processing and programmatically analyzing multiple types of signals from a distributed computing hardware ecosystem for intelligent location identification and status determination for freight loads.

BACKGROUND

Management of owner-operated freight vehicles can be complicated due to the complex nature of customer requirements and the need to convey information to the carriers (e.g., drivers) operating the vehicles. Operations computing systems provide various types of technological features for monitoring and tracking freight vehicles and performing other tasks related to the management of freight vehicles.

BRIEF DESCRIPTION OF THE DRAWINGS

Detailed discussion of embodiments directed to one of ordinary skill in the art is set forth in the specification, which refers to the appended figures, in which:

FIG. 8B depicts an example block diagram of example data stored according to aspects of the present disclosure.

DETAILED DESCRIPTION

Figure 1:
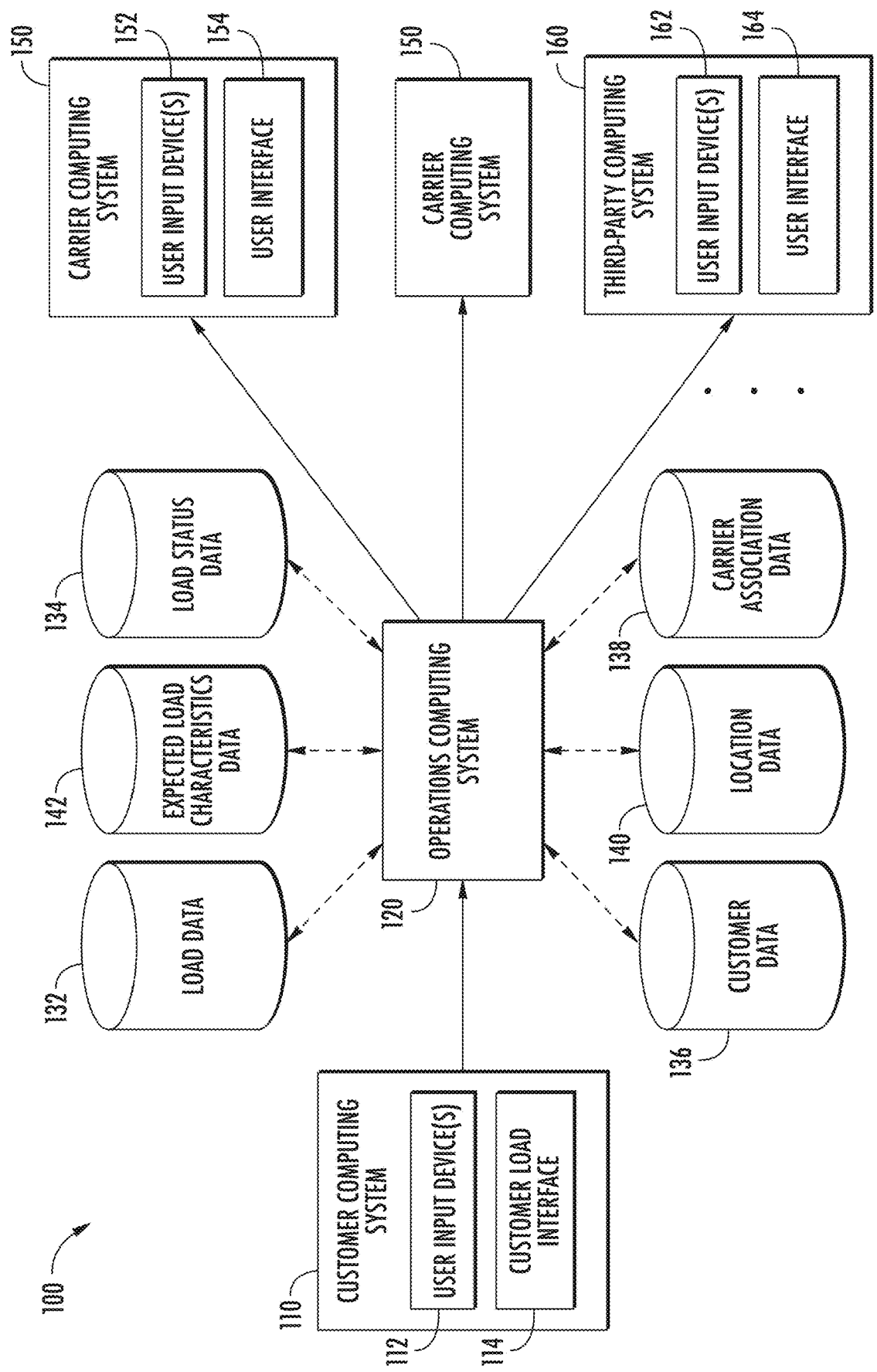
FIG. 1 depicts a block diagram of an example computing ecosystem system according to aspects of the present disclosure.

Historically, freight management has involved numerous manual interactions between freight carrier and platform employees to keep track of where the freight carriers (and associated loads) are, what time they have arrived at a location, time spent at a location, and time departed a location. A freight service can include a deployment (e.g., matching of the carrier to the freight load), pick-up (e.g., of the load), indication of leaving the pick-up location, drop-off at a destination or drop off location, and indication of leaving the drop off location. These points or states in the freight service can affect rates (e.g., amounts customers pay to have loads hauled, amounts drivers are paid for performing services), affect allocation of resources, cause computing inefficiencies, etc. Throughout a freight service, three components of a successful service can include determining the current location of a load at any point during the service, obtaining or determining a confirmation that the load has moved through states of the service, and determining an estimated time of departure or arrival for a load to various states of the service (e.g., deployment, pick-up, leaving pick-up, drop-off, leaving drop-off).

The present disclosure is directed to improved systems and methods for programmatically tracking a load by associating data from various computing sources with specific loads based on aggregating and analyzing device signals. The computing system (e.g., a network platform computing system) can track, monitor, and more accurately determine the various load states by intelligently and selectively leveraging data from one or more of a plurality of computing sources. For example, the computing system can collect data including status information from the computing source(s) and generate an initial association between a set of data associated with a computing source and a particular service instance. As further described herein, the computing system can determine an expected travel pattern for a freight carrier associated with a service instance, match a location dataset with that service instance, and perform actions based on the match. By performing multiple association techniques to associate devices and loads, the computing system for tracking loads is more robust, failure resistant, and can help prevent errors.

More particularly, the computing system can obtain location datasets from computing sources in an ecosystem of distributed computing devices/systems associated with the transportation of the freight load. For example, the computing sources can include user devices with mobile apps (e.g., associated with the freight service provider, digital freight matching service), freight carrier devices (e.g., electronic logging devices, onboard GPS, associated with tractors, trailers, etc.), third party data location services (e.g., indicating geofence activity, statuses, etc.), third party servers (e.g., in communication with one or more vehicle devices), or other computing sources. A respective location dataset can be indicative of a location of a freight carrier at the different instances of time. The datasets can include, for example, GPS signals, manually recorded times, geofence break indicators (e.g., when a monitored device enters or exits a geofence, or crosses a geofence boundary), etc.

The computing system can determine an expected signal pattern associated with a particular freight transportation service instance (e.g., for a freight carrier associated with a particular load). An expected signal pattern for a particular service instance can include an expected pattern of a carrier approaching or leaving a location associated with the service instance (e.g., a pick-up or drop-off facility). The expected pattern can be based, at least in part, on historical data collected for the respective location. For example, the historical data can include data indicative of geofence breaks, GPS data from devices associated with previous service instances associated with the particular location, etc. The historical data can be utilized to build data structures that encode location/movement patterns of computing devices (e.g., a GPS device) as a freight carrier is approaching or leaving a location.

Figure 10:
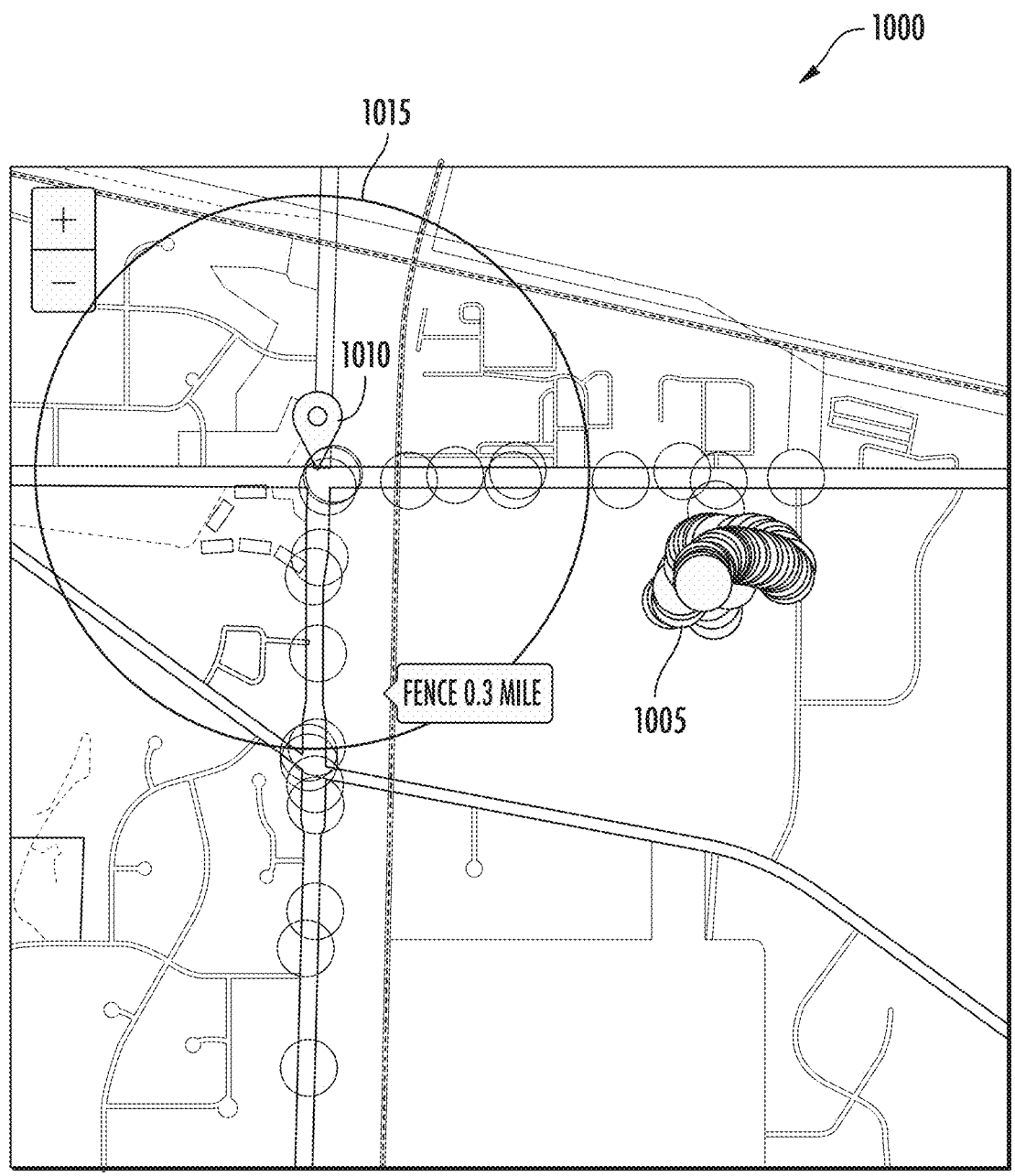
FIG. 10 depicts an example location plotting cluster according to aspects of the present disclosure.

In some implementations, the expected signal patterns can be complex patterns. For example, a complex pattern can be associated with a location (e.g., a pick-up or drop-off facility) that is located next to a highway. As depicted in FIG. 10, a location can be located near the highway but require a vehicle to travel to an exit that is several miles up the highway and back track (e.g., along a winding road) to get to the location. For example, the location can include an autonomous trucking hub located off the highway that serves as a location for transferring control (e.g., a handoff) of a load from an autonomous truck to an alternative form of control (e.g., for a first/last mile delivery).

In an example such as this, a freight carrier may break traditional geofences (e.g., with set radii that are the same across all facilities set at mile increments) multiple times while traversing the path from the highway to the location. As such, the expected signal pattern can include a winding path when approaching to the location that includes breaking a particular geofence as a freight carrier passes the location on the highway (e.g., appearing to travel away from the location) and breaking the particular geofence again as the carrier approaches the location (e.g., after exiting the highway).

To evaluate the various datasets from the various computing sources, the computing system can generate a confidence score for each respective computing source based on the expected signal pattern and the respective location dataset of the respective computing source. The confidence score can indicate a probability that the respective dataset is properly associated with a service instance.

In some implementations, the computing system can utilize matching heuristics/models to generate a confidence score for matching the load with a respective dataset of the computing sources. The computing system can use the matching heuristics/models to compare an expected signal pattern associated with an expectation of on-service device movement to the location/timing information included in a first dataset. For example, a pick-up can include a carrier approaching a pick-up location, dwelling at the pick-up location while the load is placed in or hitched to the vehicle/trailer, and departing a pick-up location. The computing system can analyze the first dataset to determine how similar the timing/location signal pairs (e.g., of GPS pings) in the first dataset are to those of the expected signal pattern. Based on the comparison, the system can determine a confidence score for the first dataset. For example, a higher confidence score can be indicative of a greater of level of similarity and a lower confidence score can be indicative of a lower level of similarity.

In some implementations, the location-based matching can include use of a machine learned model trained to determine a confidence score for the location datasets of the various computing sources. The machine-learned model (e.g., a gradient boosted tree model) can include a plurality of input layers, each input layer being associated with a different location dataset of a computing source. The machine-learned model can be trained to determine the similarity between the pattern of timing/location pairs in a respective dataset to an expected signal pattern and generate a confidence score associated therewith.

By way of example, the machine-learned model can detect a shape associated with a graphical representation of a pick-up or drop-off at a location. The machine-learned model can analyze GPS ping data (e.g., in the form of a graphical representation with time on the x-axis and distance from the location on the y-axis) and compare attributes of the graphical representation of the GPS ping data with known attributes associated with a graphical representation of expected signal pattern for a pick-up or drop-off of a load at a location. Based on this comparison, the machine-learned model can generate a confidence score indicative of a probability that the respective dataset is properly associated with a service instance (e.g., matching the expected signal pattern).

The computing system can match a dataset with a load based on the computed confidence scores. For example, the computing system can determine, from among the plurality of location datasets, a primary location dataset for representation of the location of the load being transported for the freight transportation service based on the respective confidence scores for the plurality of location datasets. The primary dataset can be the dataset with the highest confidence score. The primary dataset can be matched to the load by associating that computing source with the load for the remainder of the freight transportation service.

In some implementations, the computing system can perform additional or alternative forms of association such a truck number matching, fuzzy matching, or trailer matching. By way of example, the computing system can associate loads with a computing source based on at least one of truck number matching and trailer matching. Truck number matching can include obtaining a truck number (e.g., identifier associated with a truck number) and associating that truck number with a particular load. For example, a truck number could be "gray ghost" and associated with transportation of load A. A matching service provider could identify a "ghost" that is one of a plurality of truck numbers in a group. Based on "ghost" being closest to "gray ghost" out of the plurality of truck numbers in the group, the computing system can associate "ghost" with load A. Trailer matching can be performed in a similar manner to truck number matching. For trailer matching, the computing system can obtain a trailer number (e.g., identifier associated with a trailer) and associate that trailer number with a particular load. In some implementations, the computing system can perform a plurality of association processes concurrently or together.

The computing system can use the primary location dataset to perform actions associated with the freight transportation service. These actions can include, for example: (i) tracking a progress of the load for a freight transportation service; (ii) updating an estimated time of arrival for the load; (iii) adjusting a risk model (e.g., evaluating risk associated with late arrivals); (iv) updating a status associated with the first freight transportation service; (v) outputting a notification indicative of the status for display via a user device; (vi) determining a performance of the freight carrier; (vii) determining a compensation value for the freight carrier; or (viii) retraining a machine-learned model trained to determine the confidence score. In some implementations, the computing system can determine an in-time value (e.g., indicative of a freight carrier arriving at a facility) or out-time value (e.g., indicative of a freight carrier departing a facility) associated with the first freight transportation service based on the primary location dataset.

The technology of the present disclosure can provide a number of technical effects and benefits. For instance, aspects of the described technology can allow for more efficient use of computing resources and decrease bandwidth use and processing through improved tracking and updating of status identifiers for freight loads. Prior systems generally use simple geofences to determine arrival and departure times at facilities. These set geofences can result in false triggers for arrival or departure which can result in incorrect calculations of estimated time of arrival or reporting information. By determining trajectory based on GPS data, the system can more efficiently and accurately determine arrival, departure, or estimated times of arrival. Additionally, or alternatively, the system can automatically generate status updates thereby decreasing the amount of user input that must be processed (e.g., via manually entering the times of arrival and departure).

Referring now to FIGS. 1 through 13, example aspects of the present disclosure will be discussed in detail. It should be understood that various elements depicted in the Figures can be changed, modified, omitted, rearranged, or substituted without departing from the scope of the present disclosure.

FIG. 1 depicts a block diagram of an example system 100 for associating datasets with respective freight loads according to example implementations of the present disclosure. Computing system 100 can include operations computing system 120. Operations computing system 120 can provide various types of technological features for monitoring and tracking freight vehicles and performing other tasks related to the management of freight vehicles. For instance, operations computing system 120 associates datasets with respective freight loads.

Operations computing system 120 can communicate with one or more customer computing systems 110 or one or more carrier computing systems 150. For instance, the operations computing system 120, the customer computing system(s) 110, or the carrier computing system(s) 150 can communicate over one or more networks, such as Wi-Fi network(s), local area network(s) (LAN(s)), ethernet, cellular network(s), or any other suitable network(s).

Customer computing system 110 can be associated with a customer such as, for example, a shipper of a load. For example, a customer can create a profile or account associated with their loads on operations computing system 120 through customer computing system 110. The customer can then be provided with a customer load interface 114 facilitating input to customer computing system 100 through one or more user input devices 112. The customer can, through the customer load interface 114 or user input device(s) 112, input load data to the customer computing system 110. For instance, the load data can include load attributes such as an identifier of which shipment lane the load is associated with, pickup time, dropoff time, equipment type, etc. Although only one customer computing system 110 is illustrated in FIG. 1 for clarity, any suitable number of customer computing system(s) 110 can be included in computing system 100 or can be in communication with operations computing system 120.

The operations computing system 120 can read the load data from the customer computing system 110 to determine that the customer has added a new load to the operations computing system 120. The operations computing system can store the load data in load data store 132. The load data store 132 can be any suitable non-transitory, computer-readable media such as, for example, a cloud data storage server, a physical data storage server, a database, a databank, one or more hard drives or solid state drives, magnetic tape, or any other suitable form of data storage. The load data store 132 can be internal to or external from operations computing system 120.

Additionally, the operations computing system 120 can store an associated status for the loads in load data store 132. For instance, the statuses can be stored in load status data store 134. Although load status data store 134 is illustrated as being separate from operations computing system 120, it should be understood that the load status data store 134 may be included in a same medium as load data store 132 or other data described herein. The load status data store 134 can be any suitable non-transitory, computer-readable media such as, for example, a cloud data storage server, a physical data storage server, a database, a databank, one or more hard drives or solid state drives, magnetic tape, or any other suitable form of data storage. The load status data store 134 can be internal to or external from operations computing system 120. As described herein, a status can be automatically determined or assigned to each load in load data store 132. Once the status has been determined, the status can be stored in load status data store 134. In some implementations, however, load status data store 134 can be a simple attribute of load data store 132. For instance, the status may be stored in load data store 132 as a separate data field.

The operations computing system 120 can additionally store customer data 136. The customer data 136 can include data descriptive of customer information, such as a customer name, customer identifier, customer contact information, or other suitable data descriptive of attributes of the customer(s) using the operations computing system. Additionally or alternatively, the customer data 136 can include data associating a customer with loads (e.g., of load data store 132) that belong to the customer, such as those loads created by the customer. As one example, the customer data 136 can include a list, table, or other associative data structure describing an ownership of loads by customers.

The operations computing system 120 can additionally store carrier association data 138. The carrier association data 138 can describe associations between carriers and loads. For instance, the carrier association data 138 can describe, for a given carrier, which load(s) the carrier is registered to carry. Additionally or alternatively, the carrier association data 138 can describe, for a given load, which carrier(s) are registered to transport the load. In some implementations, the carrier association data 138 can be a list, table, or other tabulated data format for storing associations between carriers and load(s).

The operations computing system 120 can additionally store location data 140. The location data 140 can include location datasets from computing sources (e.g., customer computing system(s) 110, carrier computing system(s) 150, third-party computing system(s) 160) in an ecosystem of distributed computing devices/systems associated with transportation of a freight load. For example, the computing sources can include user devices with mobile apps (e.g., associated with the freight service provider, digital freight matching service, a mobile app in communication with an electronic logging device, a mobile app in communication with the vehicle), freight carrier devices (e.g., electronic logging devices, onboard GPS, associated with tractors, trailers, etc.), third party servers (e.g., that obtain location data from a vehicle or computing device associated with a vehicle), third party data location services (e.g., indicating geofence activity, statuses, etc.), third party servers (e.g., in communication with one or more vehicles), or other computing sources. A respective location dataset can be indicative of a location of a freight carrier (or an associated device) at different instances of time. The datasets can include, for example, GPS signals, manually recorded times, geofence break indicators (e.g., when a monitored device enters or exits a geofence, or crosses a geofence boundary). As one example, the location data 140 can include a list, table, graph, or other associative data structure describing location datasets from computing sources.

The operations computing system 120 can additionally store expected load characteristics data 142. The expected load characteristics data 142 can include an expected signal pattern associated with a particular freight transportation service instance (e.g., for a freight carrier associated with a particular load). An expected signal pattern for a particular service instance can include an expected signal pattern of a carrier approaching or leaving a location associated with the service instance (e.g., a pick-up or drop-off facility). The expected signal pattern can be based, at least in part, on historical data collected for the respective location. For example, the historical data can include data indicative of GPS data from devices associated with previous service instances associated with the particular location, geofence breaks, etc. The historical data can be utilized to build data structures that encode location/movement patterns of computing devices (e.g., a GPS device) as a freight carrier is approaching or leaving a location. As one example, the expected load characteristics data 142 can include a list, table, graph, or other associative data structure describing location datasets from computing sources. Example signal pattern graphs will be further discussed herein with reference to FIGS. 6-8.

The operations computing system 120 can communicate with one or more carrier computing systems 150. For instance, some or all carriers may have a carrier computing system 150 associated with the carrier. The carrier computing system 150 can be, for example, a user computing device such as a smartphone, tablet computer, laptop computer, a server computing system, a system onboard a carrier vehicle, or any other suitable computing system. The carrier computing system 150 can communicate with the operations computing system 120 to exchange information for managing the carriers or loads. For instance, the carrier computing system 150 can receive (e.g., based on user input at one or more user input devices 152), signals indicative of user input from the carrier. The user input can describe the carrier's interactions with various elements of a user interface 154 provided by the carrier computing system 150. For instance, the carrier can interact with the user interface 154 at the carrier computing system 150 such that the carrier computing system 150 determines that the carrier should be assigned a load. For example, the carrier may be presented with a user interface element providing for the carrier to request the load, such as a "register" button or similar element. Any suitable number of carrier computing system(s) 150 can be included in computing system 100 or can be in communication with operations computing system 120.

The operations computing system 120 can communicate with one or more third-party computing systems 160. For instance, some or all third-parties may have a third-party computing system 160 associated with the third-party. The third-party computing system 160 can be, for example, a user computing device such as a smartphone, tablet computer, laptop computer, a server computing system, a system onboard a carrier vehicle, or any other suitable computing system. The third-party computing system 160 can communicate with the operations computing system 120 to exchange information for managing the carriers or loads. For instance, the third-party computing system 160 can receive (e.g., based on user input at one or more user input devices 162), signals indicative of user input from a third-party (e.g., indicative of data associated with a vehicle). The user input can describe the third-party's interactions with various elements of a user interface 164 provided by the third-party computing system 160. For instance, the third-party can interact with the user interface 164 at the third-party computing system 160 such that the third-party computing system 160 determines that the carrier should be or is available to be assigned a load. For example, the carrier (e.g., associated with the vehicle) can launch an application associated with a freight service on a user device. Third-party computing system 160 can determine that the application has been launched on a device associated with the carrier and that the carrier is not currently assigned a load. In response, third-party computing system 160 can determine that the carrier should be or is available to be assigned the load. Additionally or alternatively, third-party computing system 160 can obtain data indicative of user input indicating that the carrier is available to be assigned a load. Third-party computing system 160 can determine that there are multiple available carriers. The system can determine which carrier is best suited to complete the freight service (e.g., based on location, activity, scheduled services). In another example, the carrier (e.g., associated with a vehicle) may be presented with a user interface element providing for the third-party to provide an update associated with a vehicle or a load, such as an "arrived," or "departed" notification (e.g., from a pick-up location, drop-off location) or similar element. Any suitable number of third-party computing system(s) 160 can be included in computing system 100 or can be in communication with operations computing system 120. Although only one third-party computing system 160 is illustrated in FIG. 1 for clarity, any suitable number of third-party computing system(s) 160 can be included in computing system 100 or can be in communication with operations computing system 120.

Figure 2:
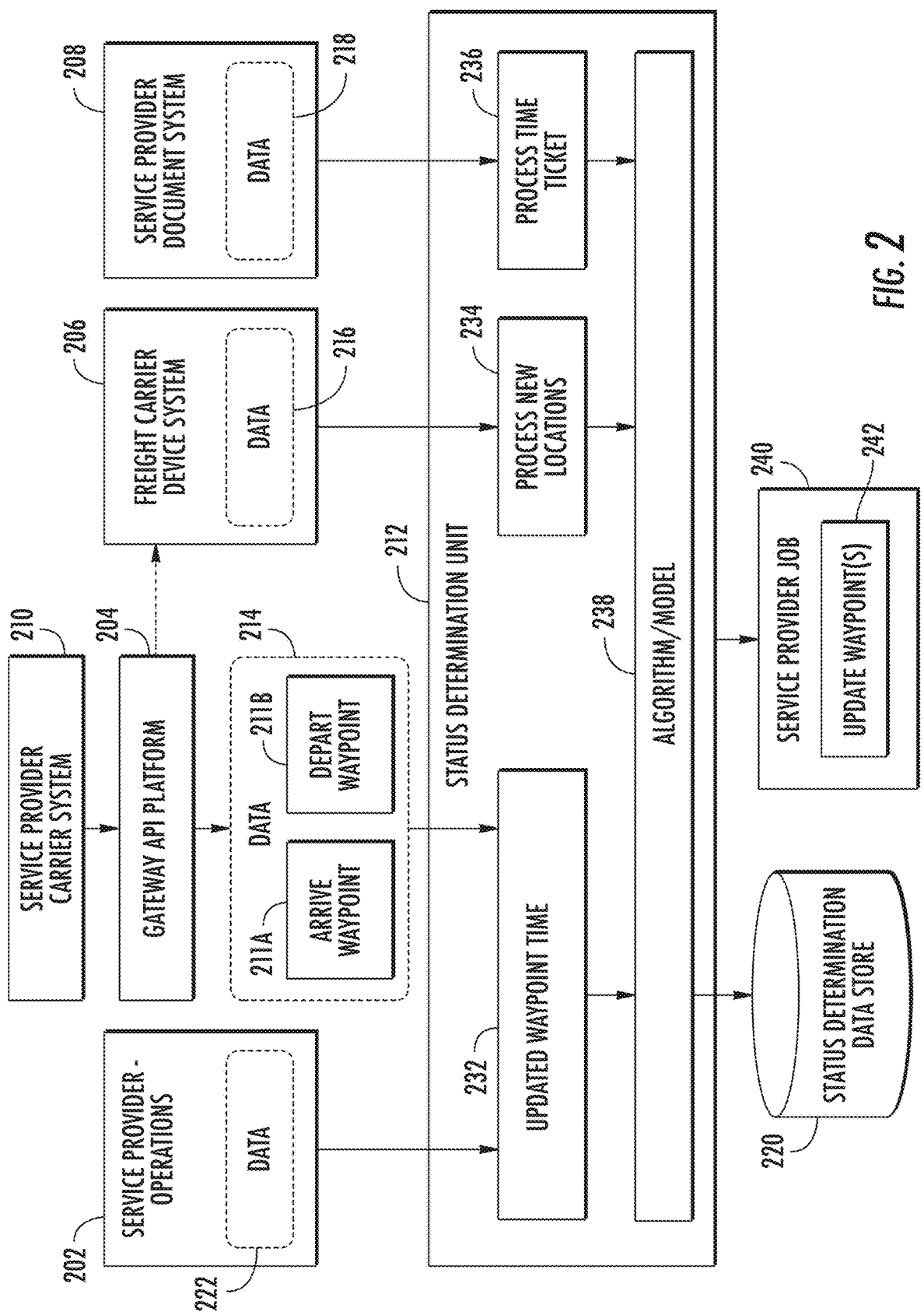
FIG. 2 depicts a block diagram of an example system architecture according to aspects of the present disclosure.

FIG. 2 depicts an example system architecture according to embodiments of the present disclosure. System 200 can include a plurality of computing sources. For example, the computing sources can include a service provider operations system 202, gateway application programming interface (API) platform 204, freight carrier device system 206, document system 208, carrier system 210, status determination unit 212, data 214, and status determination data store 220. Service provider operations system 202 and status determination unit 212 can be a part of an operations computing system (e.g., operations computing system 120). In some implementations, carrier system 210, freight carrier device system 206, and/or document system 208 can be associated with third-party devices.

A service provider can refer to, for example, a freight matching provider (e.g., digital freight matching service provider). Gateway API can be associated with a gateway between the service provider system and a service provider application on a user device (e.g., associated with a carrier). Document system 208 can be associated with the service provider or a third party. For example, the document system 208 can be associated with a third-party customer relations management system that the service provider (e.g., digital freight matching service provider) can utilize for generating and storing documents related to service performed (e.g., signed bill of landing, unsigned bill of landing, lumper receipts, customer tickets, scale tickets, gate pass, trailer, ELD logs).

The status determination unit 212 can obtain location data from a variety of computing sources. In some implementations, status determination unit 212 can obtain location data from service provider operations system 202. For example, service provider devices can include devices associated with an operations computing system (e.g., operations computing system 120, computing system associated with transportation management). The service provider operations system 202 can be associated with data 222 indicative of timing/location pairs. For example, the operations computing system can obtain data 222. The system can transmit the data 222 for different instances of time to status determination unit 212. For example, data 222 can be indicative of a vehicle or load crossing one or more geographic boundaries. This can include, for example, an indication of geofence activity, geofence break indicators, etc. when a monitored device enters or exits a geofence or when a monitored device crosses a geofence boundary. Additionally, or alternatively, data 222 can be obtained from a user manually entering expected waypoint times. For example, a computing device associated with service provider operations system 202 can obtain data indicative of user input including an expected arrival time, an expected departure time, a reported arrival time (e.g., from an oral or written communication indicating an arrival time), or a reported departure time (e.g., from an oral or written communication indicating a departure time). For example, a freight carrier can call an employee of the service provider and orally report an arrival or departure time. Data 222 can be associated with a manual override of data entry by a user, data determined using a trucking management software, data obtained from a dispatcher, data obtained via a form, data determined by a guess, data determined via an estimation process associated with the service provider operations system 202.

In some implementations, status determination unit 212 can obtain data 214 (e.g., location data) from carrier system 210 via gateway application programming interface (API) platform 204. The data 214 can include at least data indicative of an arrival waypoint 211A and a departure waypoint 211B. Carrier system 210 can obtain location data via in-application interactions Gateway API platform 204 can store one or more accessible APIs that can be used to generate data 214 in a structure to be processed by status determination unit 212. Data 214 can be indicative of user input associated with an in-application interaction. For example, data 214 can include an arrival waypoint 211A or departure waypoint 211B. In some implementations, a user can manually provide input (e.g., to a user interface of carrier system 210) indicating an expected arrival or departure time for an associated freight service instance. In an additional example, data 214 can be associated with application or carrier timing/location pairs. In some implementations, data 214 can include a GPS time (e.g., from a GPS device associated with a user device), an initial carrier time, or a customer support time.

Gateway API platform system 204 can be in communication with one or more user devices. For example, user devices can include devices with a mobile application. In some implementations, mobile applications can be associated with a freight service provider, a digital freight matching service, a third-party location service, etc. In some implementations, gateway API platform system 204 can generate location data to transmit to freight carrier device system 206. For example, the data can include GPS data obtained from a user device associated with a carrier (e.g., mobile device). In some implementations, status determination unit 212 can obtain data via gateway API platform system 204 and freight carrier device system 206 in the same time period. In some embodiments, one system may provide more frequent timing/location pairs than another system. For example, gateway API platform system 204 can obtain GPS pings every 1 minute whereas freight carrier device system 206 may obtain GPS pings every 5 minutes (or vice versa). Thus, it can be advantageous to obtain data indicative of timing/location pairs from a plurality of computing sources.

Status determination unit 212 can obtain the location data from service provider operations system 202 and carrier system 210. Status determination unit 212 can generate or store one or more updated waypoint times 232. The one or more updated waypoint times can be associated with an expected time of arrival of the carrier, expected time of departure of the carrier, etc.

Status determination unit 212 can obtain the location data from freight carrier device system 206. Freight carrier device system 206 can be associated with data 216, which can for example, be obtained from one or more freight carrier devices. As described herein, freight carrier devices can include electronic logging devices, onboard GPS devices, devices associated with tractors, devices associated with trailers, third party servers, etc. In some implementations, data 216 can be received from a third-party server (e.g., by communicating with one or more devices associated with one or more vehicles). In some implementations, data 216 can be obtained via a mobile application associated with a carrier (e.g., via gateway API platform 204). For example, a mobile application can obtain data 216 via communication with an electronic logging device, via communication with a vehicle computing system, etc. In some implementations, GPS data can be associated with GPS data determined to be within a specified distance (e.g., 0.3 miles, 0.6 miles, 0.9 miles, 1.2 miles, 1.5 miles, 2 miles, 3 miles, 6 miles, etc.). For example, GPS data can be associated with a GPS ping within a geofence.

In some implementations, status determination unit 212 can obtain location data from freight carrier device systems 206 and process new locations 234. For example, process new locations 234, in some implementations can include determining a geographic boundary (e.g., customized geofence) based on the location data obtain from the freight carrier device system 206. In some implementations process new locations 234 can include obtaining data indicative of new timing/location pairs.

Status determination unit 212 can obtain location data from document system 208 associated with data 218. For example, document system 208 can include ticket events submitted by one or more freight operators. For example, documents can include user reporting of location/time related events. For example, datasets can include manually recorded times. The manually recorded times can be associated with arrival or departure at a facility (e.g., for picking up or dropping of a load). Status determination unit 212 can process data 218 via process time ticket 236. For example, process time ticket 236 can include optical character recognition (OCR), natural language processing, etc. to extract relevant data indicative of timing/location pairs. In some implementations data 218 can include data associated with documents of a trailer, a gate pass, one or more scale tickets, a printed bill of landing, an unsigned bill of landing, a signed bill of landing, a lumper receipt, or an electronic logging device log.

Status determination unit 212 can obtain the various types of data and use the obtained data to perform one or more actions. For example, the actions can include updating waypoint time(s) 232, processing new locations 234, or processing time tickets 236. Timing/location pairs determined via updated waypoint time 232, processed new locations 234, or processed time ticket 236 can be used to perform a matching between the computing sources and a particular service instance (e.g., associated with a load). Matching can be performed using algorithm/model 238. Status determination data store 220 can obtain data generated using algorithm/model 238 indicative of matches between computing sources and a particular service instance.

For example, algorithm/model 238 can be used to perform operations associated with tracking a load. For example, the operations can include matching the location data from each respective computing source to a particular service instance (e.g., for transporting a particular load). Additionally, or alternatively, the algorithm/model 238 can be used to generate a confidence score for each respective match. Matching each respective computing source to a particular service instance can include an indication that a computing source (e.g., device, provider asset, vehicle) has been successfully identified for tracking of a particular service instance. In some embodiments, this can allow for providing automatic status updates being triggered based on location data of the associated computing source for providing updates to a customer (e.g., merchant using the freight service to ship or receive items associated with a specific load).

Status determination unit 212 can transmit the matching data to be stored in status determination data store 220. Additionally, or alternatively, status determination unit 212 can transmit the matching data to service provider job 240. Service provider job 240 can include one or more waypoint updates 242. The waypoint update(s) 242 can include an indication of an update in progress, updated ETA, etc. In some implementations, a subscription to a particular vehicle's (or associated device's) location data can be initiated. A subscription can include an indication to receive progress updates on a particular vehicle's progress through a particular service instance. For example, a customer (e.g., shipper, purchaser) may want to receive updates on a service instance progress. As such the customer can subscribe to the particular vehicle's location data. This location data can be used for determining the current location of a load at any point during the service, obtaining or determining a confirmation that the load has moved through states of the service, and determining an estimated time of departure or arrival for a load to various states of the service (e.g., deployment, pick-up, leaving pick-up, drop-off, leaving drop-off).

FIG. 2 generally depicts an example system architecture for funneling data obtained from a plurality of computing sources through the status determination unit 212. In some implementations, algorithm/model 238 can be fine-tuned or updated based on data stored in status determination data store 220. In some implementations, data stored in status determination data store 220 can be used as a quality check for data that is newly generated by status determination unit 212. In some implementations, data in status determination data store 220 can be permanently deleted at set increments of time.

Figure 3:
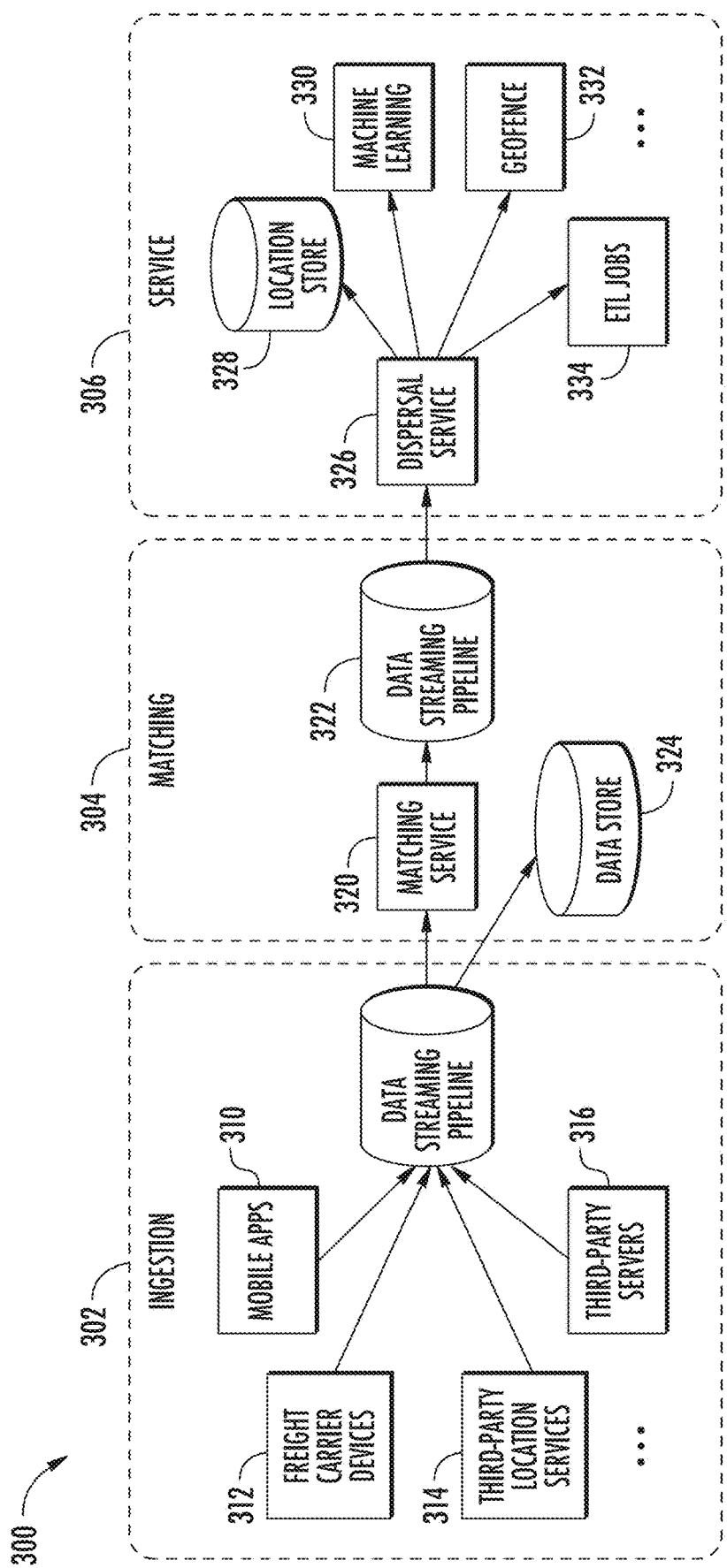
FIG. 3 depicts a block diagram of an example dataflow according to aspects of the present disclosure.

While FIG. 2 depicts an example system architecture comprising a variety of computing devices from which the system can obtain location data, FIG. 3 depicts an example of data movement flow 300 according to example aspects of the present disclosure. Data movement can include ingestion phase 302, matching phase 304, and service phase 306.

Ingestion phase 302 can include obtaining location data from a variety of computing sources. The computing sources can include user devices associated with mobile apps 310, freight carrier devices 312, third-party location services 314, third-party servers 316. Ingestion phase 302 can include obtaining the data from the computing sources and obtaining data to be sent to data streaming pipeline 318. For example, ingestion phase 302 can include obtaining a plurality of location datasets from a plurality of computing sources, wherein a respective location dataset is indicative of a location of a freight carrier at different instances of time. For example, computing sources can include at least one of: (i) a mobile application, (ii) a freight carrier device, (iii) a third-party location service, or (iv) a carrier system.

User devices associated with mobile apps 310 can include mobile applications associated with the freight service provider, mobile applications associated with the digital freight matching service, etc. Freight carrier devices 312 can include electronic logging devices, onboard GPS devices, devices associated with tractors, devices associated with trailers, etc. Third-party location services 314 can include services indicating geofence activity, services associated with updating statuses, etc. Third-party servers 316 can include servers in communication with one or more vehicles (or vehicle devices). A respective location dataset can be indicative of a location of a freight carrier at different instances of time. The datasets can include, for example, GPS signals, manually recorded times, geofence break indicators (e.g., when a monitored device enters or exits a geofence, or crosses a geofence boundary), etc. In some implementations, at least one respective location dataset can include a plurality of GPS signals.

Data streaming pipeline 318 can ingest and process data in real-time. For example, the data streaming pipeline 318 can be capable of various functionalities. In some implementations, the functionalities can include publishing or subscribing to streams of records, storing streams of records in the order of record generation, or processing streams of records in real time. Subscribing to streams of records can include regularly receiving streams of records (e.g., as new records are obtained, on a set time interval). In some implementations, data can be pushed from the computing sources. In some implementations, the data can be pulled from the computing sources.

Matching phase 304 can include obtaining data from data streaming pipeline 318 by matching service 320 or data store 324. Matching service 320 can perform one or more actions to associate the location data from the computing sources to particular service instances (e.g., loads). Matching service 320 can transmit data indicative of the matches to data streaming pipeline 322. Data indicative of the matches can be stored in data store 324. In some implementations, data from data store 324 can be analyzed for quality to check for completeness, validity, errors, etc.

Figure 6:
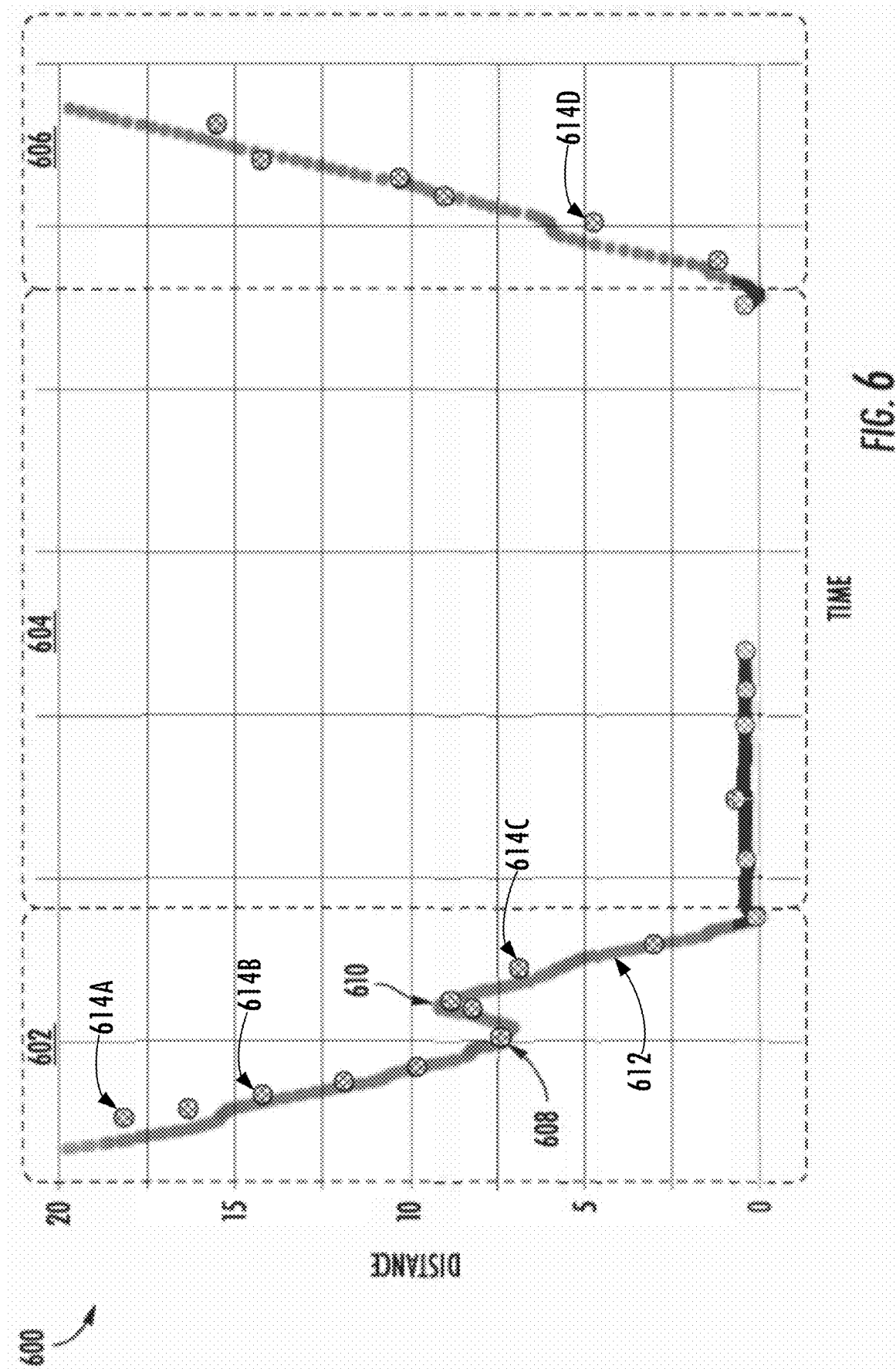
FIG. 6 depicts an example waypoint graph according to aspects of the present disclosure.

By way of example, matching phase 304 can include determining, for the freight carrier, an expected signal pattern for a location associated with a first freight transportation service. In some implementations, the location associated with the first freight transportation service can include a facility for pick-up or delivery of the load. By way of example, determining an expected signal pattern can include filtering the plurality of location datasets to a limited time period associated with an appointment time associated with the first freight transportation service. Determining an expected signal pattern can include filtering the plurality of location datasets to a limited geographical area associated with the facility. This can include, for example, determining the expected signal pattern based on the limited time period and the limited geographical area. For instance, the system can obtain data from seventy-five vehicles that have known arrival and departure time for a particular facility. The data can be aggregated and analyzed to determine an expected travel pattern comprising location/timing pairs of data for a vehicle approach and departing from the facility. The system can perform some operations to smooth out the expected signal pattern and can update the signal pattern as more signal data is obtained. In some embodiments, the expected signal pattern is indicative of a distance and time relationship for at least one of: (i) approaching the location associated with the first freight transportation service; or (ii) leaving the location associated with the first freight transportation service. A graphical representation of an example expected signal pattern is shown in FIG. 6.

Matching phase 304 can include for each respective computing source of the plurality of computing sources, generating a respective confidence score based on the expected signal pattern and the respective location dataset of the respective computing source. The respective confidence score can be indicative of a probability that the respective location dataset of the respective computing source is representative of a load location associated with a load being transported for the first freight transportation service. In some implementations, determining a respective confidence score includes generating a comparison of the respective location dataset of the respective computing source associated with the freight carrier at the different instances of time with the expected signal pattern of the freight carrier, as will be further described herein. For example, the respective confidence score can be based on the comparison of the respective location dataset of the respective computing source associated with the freight carrier at the different instances of time with the expected signal pattern of the freight carrier.

In some implementations, generating the respective confidence score based on the expected signal pattern and the respective dataset can include generating the respective confidence score using a machine-learned model trained to output the probability that a respective location dataset of the respective computing source is representative of the load location associated with a load being transported for the first freight transportation service. In some embodiments, the machine-learned model can be a gradient boosted tree model. The machine-learned model can include a plurality of input layers, each input layer being associated with a different location dataset of a computing source.

Matching phase 304 can include determining, from among the plurality of location datasets, a primary location dataset for representation of the location of the load being transported for the first freight transportation service based on the respective confidence scores for the plurality of location datasets. For example, the primary location dataset can include the location data from the computing device associated with the highest confidence score (e.g., as determined by the machine-learned model).

Data streaming pipeline 322 can ingest and process data in real-time. Data streaming pipeline 322 can ingest data from matching service 320 and push data to data store 324 or dispersal service 326. For example, the data store can be capable of various functionalities. In some implementations, the functionalities can include publishing or subscribing to streams of records, storing streams of records in the order of record generation, or processing streams of records in real time. Subscribing to streams of records can include regularly receiving streams of records (e.g., as new records are obtained, on a set time interval). In some implementations, data can be pushed from the computing sources. In some implementations, the data can be pulled from the computing sources.

Service phase 306 can include obtaining the association data, determining current location data from a computing source, and pushing the data (e.g., via dispersal service 326) to be used in a plurality of use cases. Use cases can include storing data in location store 328, machine learning use 330, geofence 332, or extract, transform, and load (ETL) jobs 334. For example, data can be used to train and update a machine learned model (e.g., machine learning use 330). Additionally, or alternatively, geofence 332 use can include generation of customized geofences, generation of multiple geofences.

In some implementations, data can be used for performing one or more actions associated with the first freight transportation service based on the primary location dataset. By way of example, the one or more actions associated with the first freight transportation service can include determining, based on the primary location dataset for the load, at least one of an in-time value or an out-time value for the location associated with the first freight transportation service. For example, an in-time value can be indicative of a time that a freight load is determined to arrive at a facility (e.g., for pick-up or drop-off) and an out-time value can be indicative of a time that a freight load is determined to leave a facility (e.g., for pick-up or drop-off). In-time and out-time values can be used to determine efficiency metrics, compensation for drivers, discounts for customers (e.g., shippers), etc.

Additionally, or alternatively, the one or more actions associated with the first freight transportation service can include at least one of: (i) tracking a progress of the load for the first freight transportation service; (ii) updating an estimated time of arrival for the load; (iii) adjusting a risk model; (iv) updating a status associated with the first freight transportation service; (v) outputting a notification indicative of the status for display via a user device; (vi) determining a performance of the freight carrier; (vii) determining a compensation value for the freight carrier; or (viii) retraining a machine-learned model trained to determine the respective confidence score.

Tracking a progress of the load for the first freight transportation service can include determining a current status of the first freight transportation service. For example, once a primary computing source is chosen, the computing system (e.g., operations computing system 120) can use that computing source to determine a carrier or vehicle's location. The computing system can determine that the location/timing data is indicative of the carrier or vehicle performing a particular stage of the freight transportation service. By way of example, the data can be indicative of the carrier or vehicle arriving at a pick-up facility. The computing system can determine that the status of the freight transportation service is "arrived at pick-up". The computing system can determine that freight transportation service's progress is indicative of at least one of: on route to pick-up location, dwelling at pick-up location, loading vehicle, on route to drop-off location, dwelling at drop-off location, unloading vehicle, service completed, etc.

Updating an estimated time of arrival for the load can include determining the current location of the freight transportation service and performing one or more calculations to determine an estimated time of arrive for the load. For example, an estimated time of arrival for the load can be indicative of an estimated time for the load to reach a drop-off location. In some instances, the computing system can determine the estimated time of arrival based on a current location and a status of the transportation service. For example, the computing system can consider traffic data, etc. to determine expected travel patterns. Additionally, or alternatively, the computing system can have a confidence associated with the estimated time of arrival. For example, the computing system can have a greater confidence in the accuracy of an estimated time of arrival once the carrier or vehicle is on route to the drop-off location after departing the pick-up location. Additionally, or alternatively, the computing system can have a lower confidence in the accuracy of an estimated time of arrival before the carrier or vehicle has arrived at the pick-up location. For example, the amount of time that loading may take could be unknown (e.g., for a new facility, a facility with a wide range of dwelling times).

Adjusting a risk model can include obtaining an output indicative of a probability that the load will arrive late to at least one of a pick-up or drop-off location. For example, a risk model can be a mathematical representation including one or more probability distributions. The risk model can utilize historical data from prior freight service instances to adjust the model to more accurately predict a probability that the load will arrive late to at least one of a pick-up or drop-off location. As the computing system obtains more data associated with freight service instances, the model can be updated to more accurately determine the probability that a future load will arrive late to at least one of a pick-up or drop-off location. Risk models can be associated with expected dwelling times, traffic patterns, freight carrier habits, etc. For example, freight carrier habits could include preferred driving times (e.g., during daytime or night time), frequency of stops, average speed, maintenance status of vehicle, etc.

Updating a status associated with the first freight transportation service can include generating, automatically, one or more status updates for the load being transported for the first freight transportation service. For example, a status associated with the first freight transportation service can include on route to pick-up location, dwelling at pick-up location, loading vehicle, on route to drop-off location, dwelling at drop-off location, unloading vehicle, or service completed.

Outputting a notification indicative of the status for display via a user device can include transmitting data which causes one or more status updates for the load to be provided for display on one or more user devices. For example, the one or more user devices can include user input devices associated with customers (e.g., user input device(s) 112), carriers (e.g., user input device(s) 152), or third parties (e.g., user input device(s) 162).

Determining a performance of the freight carrier can include comparing data associated with one or more service instances performed by the freight carrier to a threshold service level. For example, a threshold service level can be defined by a service provider (e.g., associated with freight matching) or can be based on a comparison to other freight carriers who have performed similar service instances. For instance, the computing system can compare the current freight carrier's service level to a threshold service level. If the freight carrier's service level is above the threshold service level, the computing system can determine that the freight carrier has acceptable performance. If the freight carrier's service level is below the threshold service level, the computing system can determine that the freight carrier has an unacceptable performance. The computing system can provide an indication of freight carrier performance via an interface on a device associated with the service provider (e.g., freight matching service). In some implementations, the performance of the freight carrier can be used to determine future service instances to offer to the freight carrier or ranking of candidate service instances for the freight carrier.

Determining a compensation value for the freight carrier can include adjusting the compensation for a freight carrier based on one or more events during the performance of a service instance. For example, a service instance can be associated with an expected dwell time at a pick-up location of 1 hour and an expected dwell time at a drop-off location of 1.5 hours. In some implementations, the computing system can determine that the carrier or vehicle dwelled at the pick-up location for 3 hours and the drop-off location for 1.5 hours. Due to the dwell time at the pick-up location being longer than expected, the freight carrier may be compensated above an agreed upon flat rate for the service.

Retraining a machine-learning model trained to determine the respective confidence score can include retraining through the use of one or more model trainers and training data. As an example, the models can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the computing system can include one or more models for determining respective confidence scores of the computing sources.

In some implementations, the computing system can obtain the one or more models using communication interface(s) to communicate with the second computing system over the network(s). For instance, the computing system can store the model(s) (e.g., one or more machine-learned models) in the memory. The computing system can then use or otherwise implement the models (e.g., by the processors). By way of example, the computing system can implement the model(s) to generate confidence score(s) for respective computing sources.

In some implementations, the computing system can train one or more machine-learned models of the model(s) through the use of one or more model trainers and training data. The model trainer(s) can train any one of the model(s) using one or more training or learning algorithms. One example training technique is backwards propagation of errors. In some implementations, the model trainer(s) can perform supervised training techniques using labeled training data. In other implementations, the model trainer(s) can perform unsupervised training techniques using unlabeled training data. In some implementations, the training data can include simulated training data (e.g., training data obtained from simulated scenarios, inputs, configurations, environments, data from data store 925 etc.). In some implementations, the computing system can implement simulations for obtaining the training data or for implementing the model trainer(s) for training or testing the model(s). By way of example, the model trainer(s) can train one or more components of a machine-learned model for determining confidence score(s) through unsupervised training techniques using an objective function (e.g., costs, rewards, heuristics, constraints, etc.). In some implementations, the model trainer(s) can perform a number of generalization techniques to improve the generalization capability of the model(s) being trained. Generalization techniques include weight decays, dropouts, or other techniques.

Figure 4:
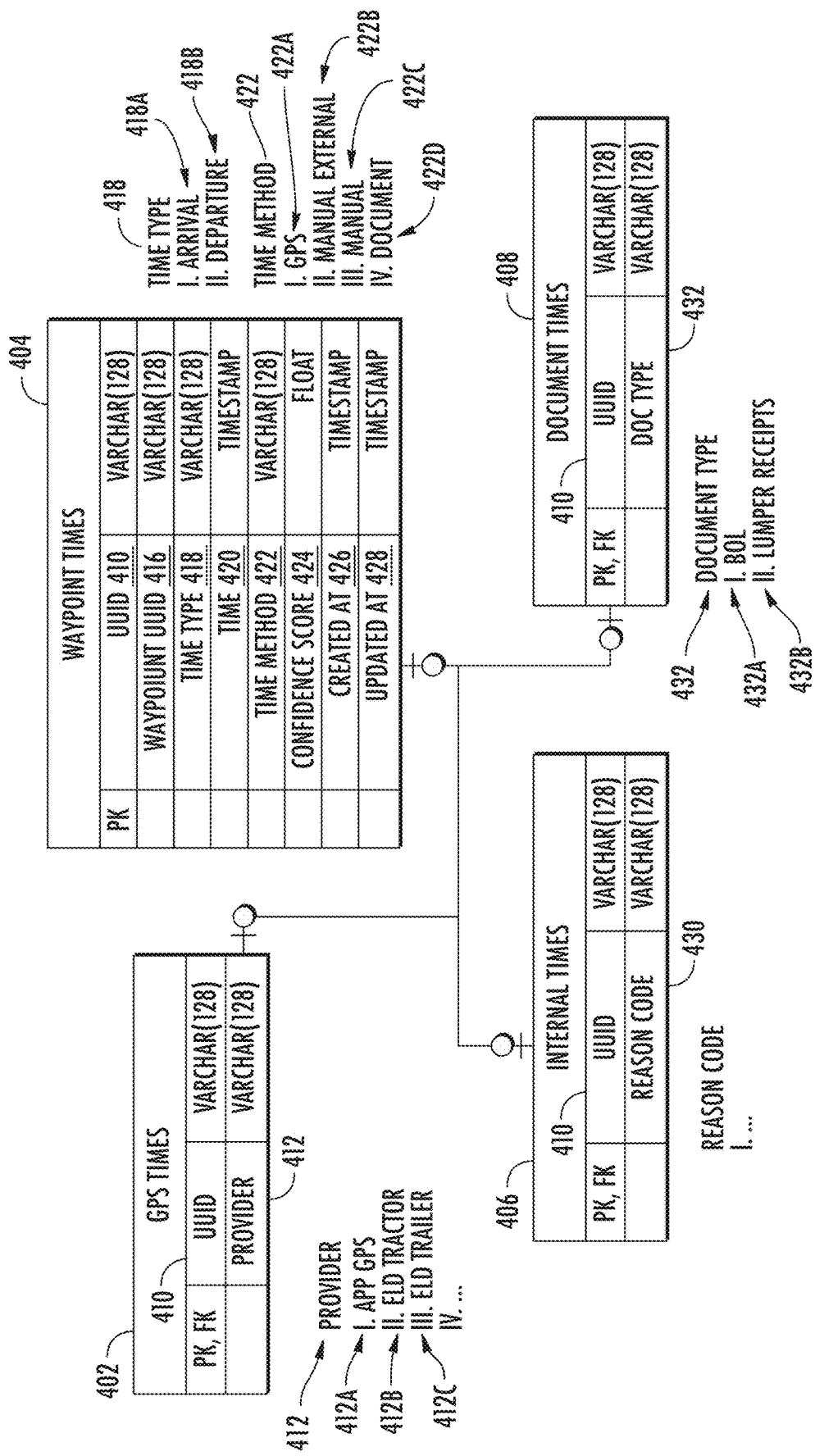
FIG. 4 depicts a block diagram of example data stored according to aspects of the present disclosure.

FIG. 4 depicts an example of data in a data store. This can include location data from a plurality of computing sources such as, for example, GPS time data 402, waypoint time data 404, internal time data 406, or document time data 408.

GPS time data 402 can store information associated with acquired GPS signals. GPS time data 402 can include a unique user identifier 410, or one or more provider data 412 associated with one or more providers 412A-C. Providers can include, for example an application GPS 412A, an electronic logging device (ELD) associated with a tractor 412B, or an ELD associated with a trailer 412C. Unique user identifier 410 and provider(s) 412A-C can be stored as a text string or other suitable representation.

Waypoint time data 404 can store information associated with waypoints indicated in device signals. Waypoint time data 404 can include a unique user identifier 410, waypoint unique user identifier 416, time type 418, time 420, time method 422, confidence score 424, a "created at" indicator 426 (e.g., indicating the time the record was created), or an "updated at" indicator 428 (e.g., indicating the time the record was updated). Unique user identifier (UUID) 410, waypoint unique user identifier 416, time type 418, time method 422 can be stored as a text string. Time 420, created at 426, and updated at 428 can be stored as a timestamp. Confidence score 424 can be stored, for example, as a numerical value, float, percentage, level indication (e.g., high, low, etc.), color, or other suitable representations. Time type 418 can indicate the type of action associated with the time such as, for example, an arrival time 418A or a departure time 418B. Time method 422 can include for example, GPS 422A, manual external time 422B, manual internal 422C, or a document 422D. Waypoint time data 404 can include some similar information as GPS time data 402, internal time data 406, document time data 408, or other sources.

Internal time data 406 can include times associated with a particular freight service provider, digital freight matching service, etc. Internal time data 406 can include unique user identifier 410, and one or more reason codes 430. Reason code(s) 430 can include data associated with amounts paid for freight services, reasons for withholding payment for a service, etc.

Document time data 408 can include unique user identifier 410, and one or more document types 432. Document type(s) 432 can include for example, bill of landing 432A or lumper receipts 432B. A bill of landing 432A can include details of a shipment, manually recorded information associated with arrival, departure, etc. Lumper receipts 432B can include information about amounts paid to third-parties for aiding in loading/unloading shipment contents. Lumper receipts, can for example, include information about the location of the service, time of service, etc. Additionally, or alternatively, document time data 408 can include unsigned bill of landings, signed bill of landings, trailer documents, scale tickets, or printed bill of landings.

Data from waypoint time data 404 can be used to determine in and out-times associated with a particular service instance. For example, in-times can be associated with a carrier arriving at a facility (e.g., for a pick-up, drop-off). By way of example, out-times can be associated with a carrier departing a facility (e.g., for a pick-up, drop-off).

Data described in FIG. 4 can be stored in permanent or temporary forms. UUID 410 can be a primary key for waypoint time data 404. UUID 410 can be a primary key or foreign key for GPS time data 402, internal time data 406, or document time data 408. Data tables as described herein can be generated or stored for a plurality of UUIDs associated with a plurality of computing sources, particular freight instances, loads, user devices, etc.

As will be described herein, one or more of the types of data of FIG. 4 can be used to determine a confidence score. The confidence score can be indicative of a confidence that the data associated with a computing source is correctly paired with a particular service instance (e.g., load). For example, as further described herein, a confidence score can be based on an expected signal pattern and a respective location dataset and can be indicative of a probability that the respective location dataset of the respective computing sources is representative of the load location associated with a load being transported for a first freight transportation service. The respective location data set can include one of more of the types of data shown in FIG. 4.

Figure 5:
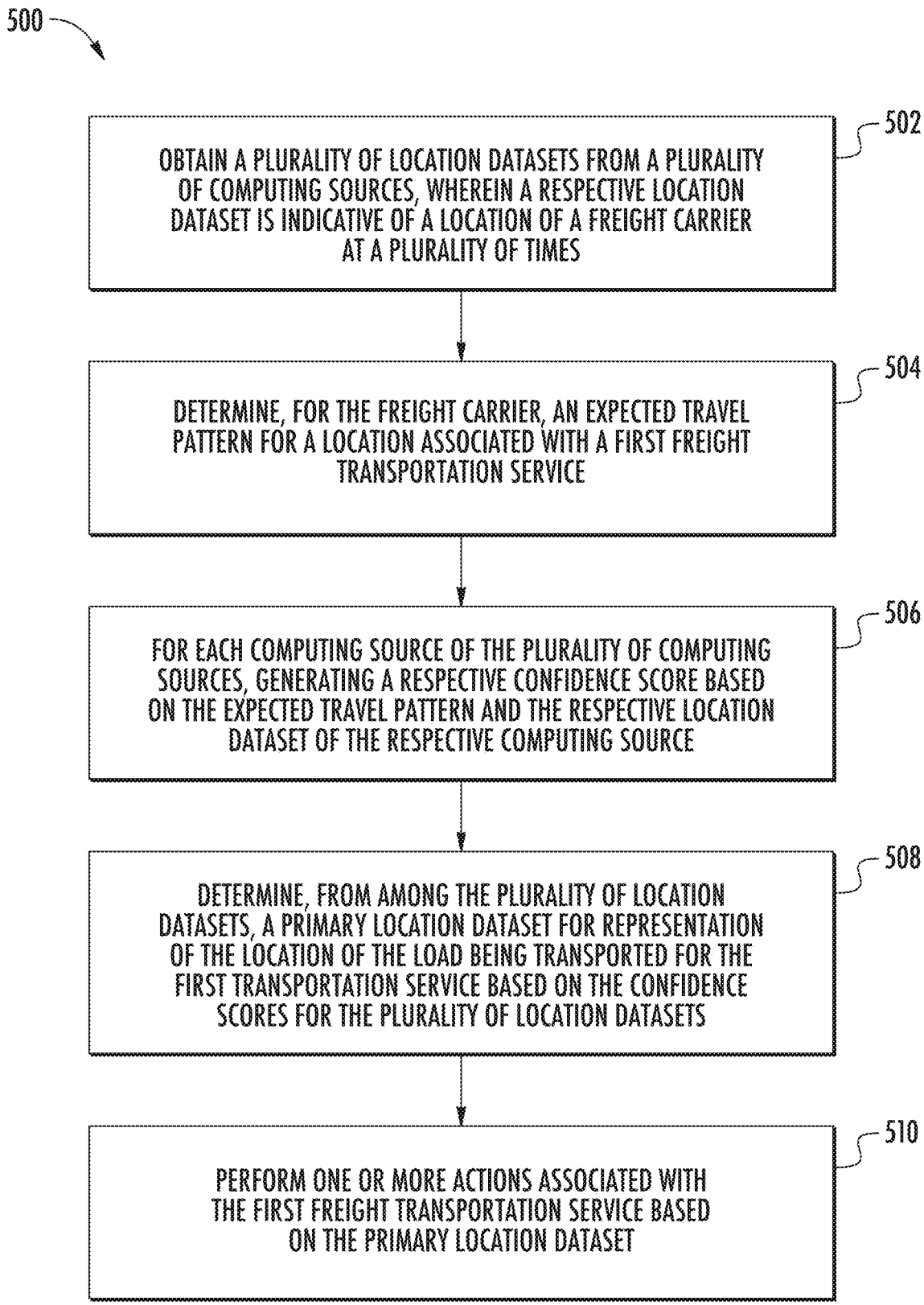
FIG. 5 depicts example method according to aspects of the present disclosure.

FIG. 5 depicts a flowchart diagram of an example method 500 for shipping a load with an operations computing system according to example implementations of the present disclosure. One or more portions of the method 500 can be implemented by one or more computing devices such as, for example, the computing devices described herein. Moreover, one or more portions of the method can be implemented as an algorithm on the hardware components of the device(s) described herein. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. The method can be implemented by one or more computing devices.

At (502), method 500 can include obtaining a plurality of location datasets from a plurality of computing sources. For instance, a computing system (e.g., an operations computing system associated with a service entity) can obtain a plurality of location datasets from a plurality of computing sources. As described herein the respective location dataset can be indicative of a location of a freight carrier at different instances of time. For example, location dataset can include a plurality of timing/location pairs associated with a computing source. By way of example, the timing/location pairs can include GPS pings.

At (504), method 500 can include determining, for the freight carrier, an expected signal pattern for a location associated with a first freight transportation service. For instance, a computing system (e.g., an operations computing system associated with a service entity) can determine, for the freight carrier, an expected signal pattern for a location associated with a first freight transportation service.

As described herein an expected signal pattern can be associated with a graphical depiction. In some implementations, the graphical depiction can include a particular shape of the data points. For instance, in complex signal pattern cases, a location (e.g., freight facility) can have a unique path that is traveled to arrive at the location.

FIG. 6 depicts an example of a graphical depiction 600 of a signal pattern associated with the approach 602, dwelling 604, and departure from a shipment facility 606. For example, graphical depiction 600 can include an x-axis representing time and a y-axis representing distance. As a vehicle approaches a shipment facility, location data (e.g., GPS data, timing/location pairs) associated with a vehicle location and different instances of town can be obtained. The location data can be presented in a graphical form. In some implementations, a vehicle may approach a facility, decrease speed as depicted at point 608. For example, at point 608 a vehicle may be traveling along a winding road that takes the vehicle away from the facility. In a traditional geofence model, this travel pattern may result in a false trigger of a geofence event (e.g., an update to a carrier, update to customer). The vehicle may move away from the facility, decrease speed, and change direction again at point 610. The vehicle can approach the shipment facility.

Dwelling 604 can represent vehicle location data indicating that a user has arrived at a shipment facility and remained at a shipment facility for a period of (e.g., indicative of picking up/dropping off a load). During a dwell state, the distance is expected to be very close to the minimum distance seen for a vehicle during a trip.

Departure from a shipment facility 606 can include data points indicative of the distance between the vehicle and the facility increasing as time increases. Graphical depiction 600 can include information indicative of velocity, direction, etc. For example, the direction of travel can be determined by the slope of the line. The slope of the line can be determined using the following equation: slope=(facility distance A−facility distance B)/(time A−time B).

Graphical depiction 600 can for example, represent an expected signal pattern 612 and one or more data points (e.g., data points 614A-C) representing a signal pattern associated with a location dataset from a computing source. As described herein, a graphical depiction of an expected signal pattern for a particular facility can be generated. Data indicative of a signal pattern associated with location dataset of a computing source can be obtained. The data indicative of a signal pattern 614 associated with location dataset of a computing source can be compared to an expected signal pattern 612 for a particular facility. The system can perform one or more matching methods to determine if the obtained signal pattern 614 should be associated with a specific freight load. For example, the system can use a graphical depiction of an expected signal pattern 612 to perform various steps of the method including step 504, 506, and 508. In some implementations, the expected signal pattern 612 can include a plurality of data points associated with an expected travel path indicative of a road traversed to arrive at the location associated with the first freight transportation service.

Figure 7A:
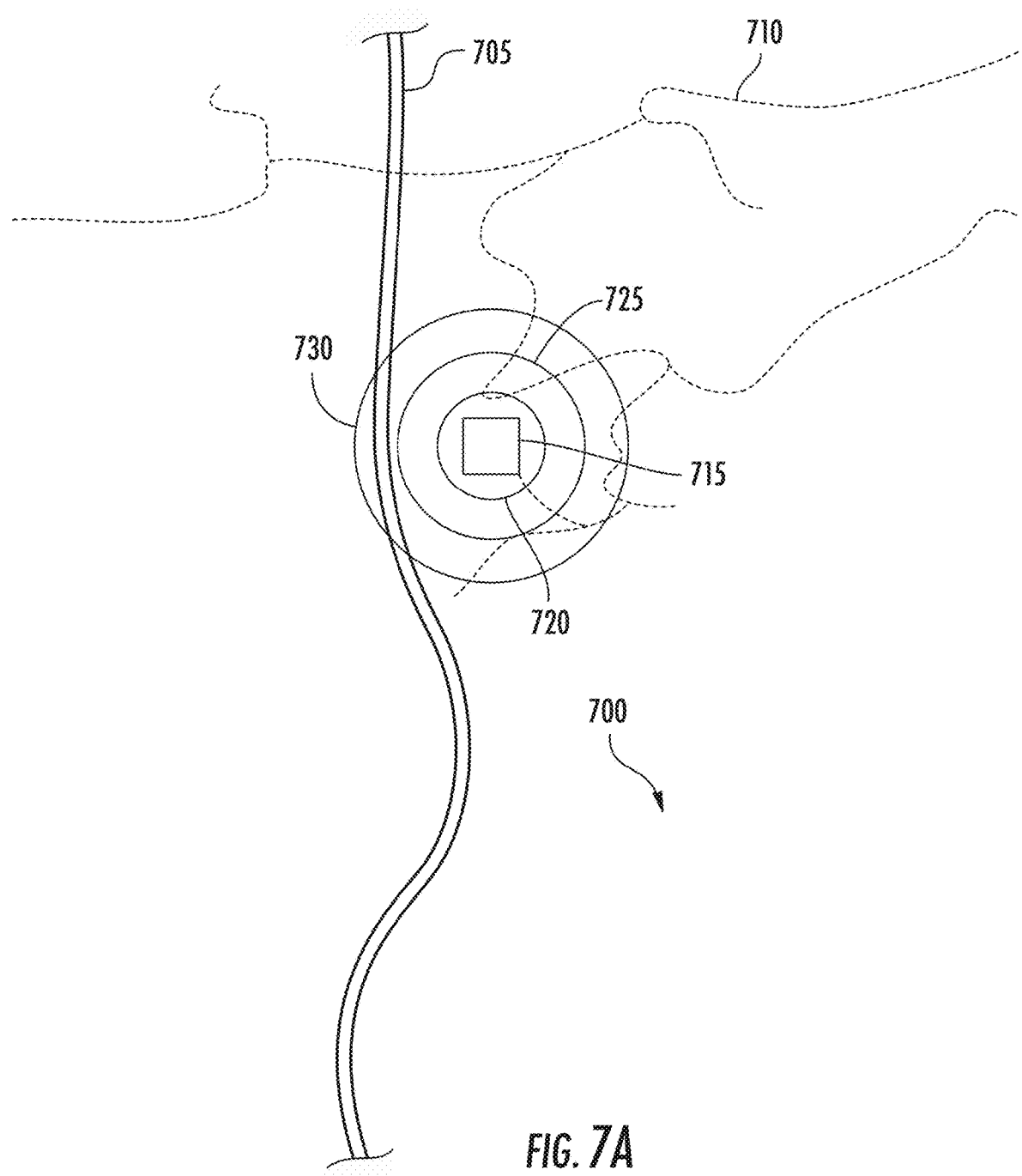
FIGS. 7A-7B depict an example geographic area according to aspects of the present disclosure.
Figure 7B:
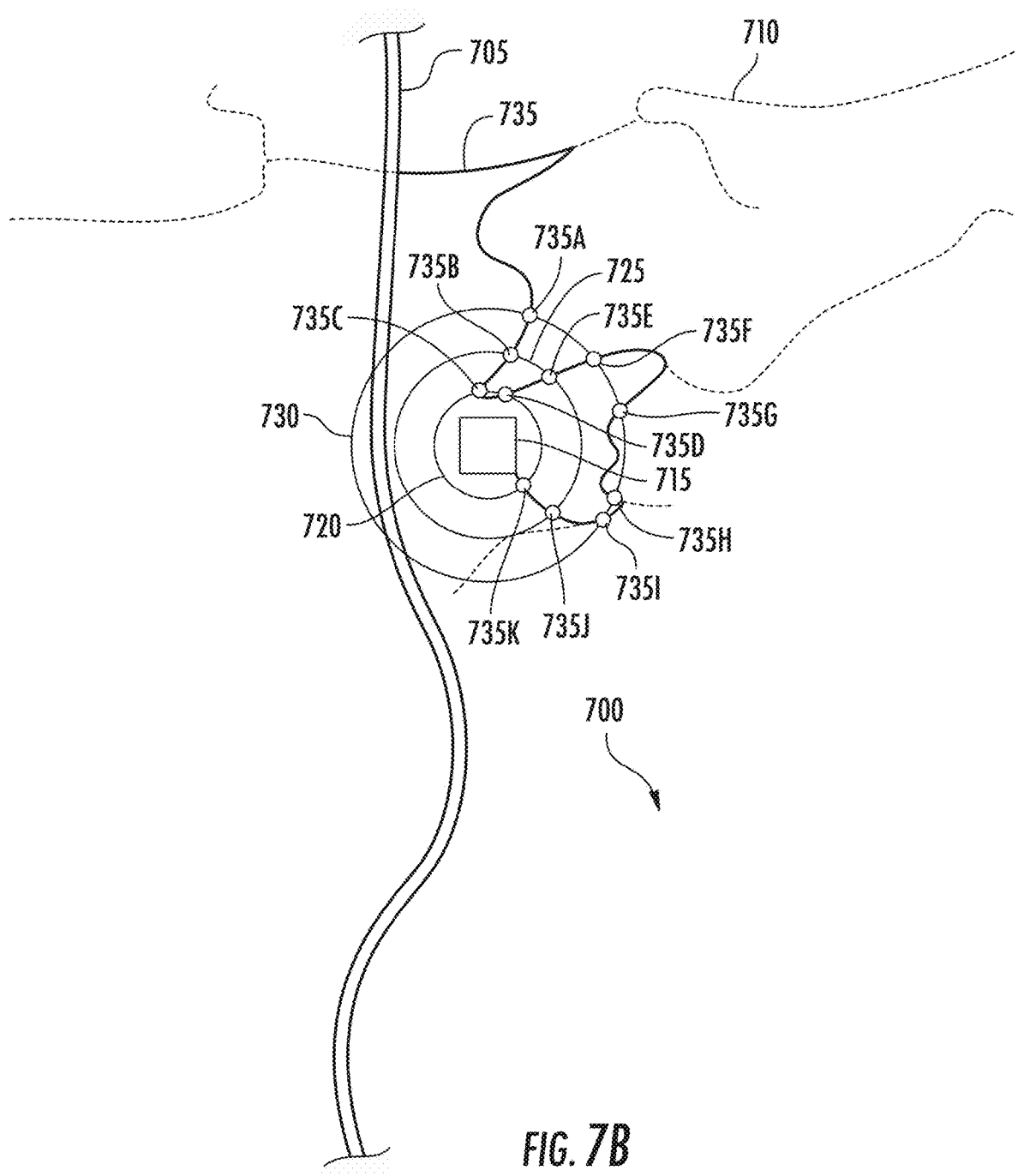

As depicted in FIGS. 7A and 7B, the complex signal pattern can have a distinctive shape. In some implementations, the distinctive shape can be used to determine that a location dataset is associated with a particular service instance. For example, FIGS. 7A-7B depict an example geographic area 700 including highway 705, roads 710, facility 715, geofence 720, geofence 725, and geofence 730. FIG. 7B depicts example path 735 for a vehicle approaching facility 715. For example, path 735 can include multiple instances of geofence crossings 735A-735K. A graphical depiction of a vehicle travelling along path 735 is depicted in FIG. 8A.

Figure 8A:
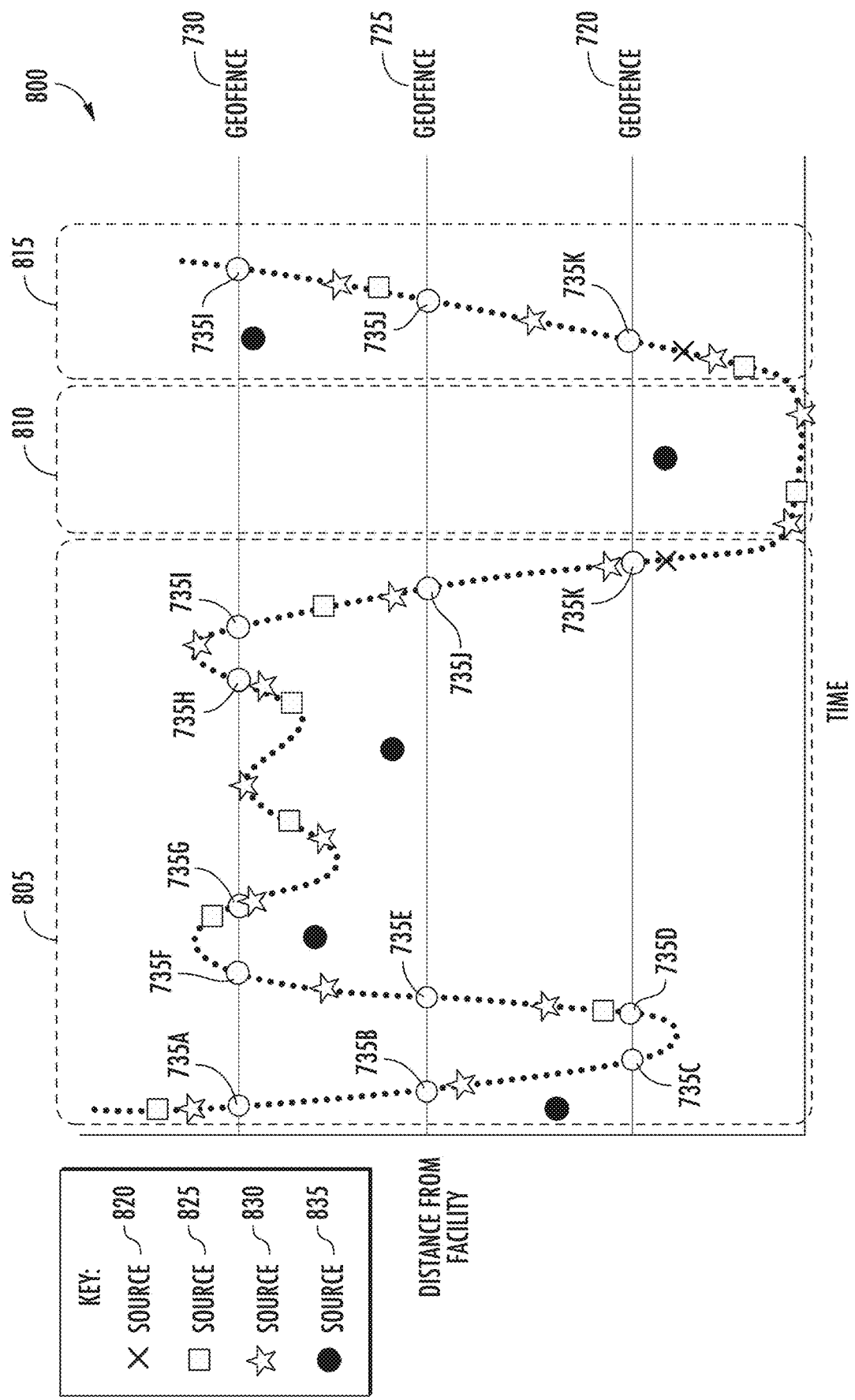
FIG. 8A depicts an example waypoint graph according to aspects of the present disclosure.

FIGS. 7B and 8A depict an example where traditional methods using solely geofence indicators can trigger false indications of arrival. For example, geofence 720 being crossed at point 735C and 735D opposed to the system indicating the vehicle has arrive and is dwelling at facility 715 based on crossing geofence 720 at point 735K.

At (506), method 500 can include generating, for each respective computing source of the plurality of computing sources, a respective confidence score based on the expected signal pattern and the respective location dataset of the respective computing source. For instance, a computing system (e.g., an operations computing system associated with a service entity) can generate, for each respective computing source of the plurality of computing sources, a respective confidence score based on the expected signal pattern and the respective location dataset of the respective computing source. As described herein, the respective confidence score is indicative of a probability that the respective location dataset of the respective computing source is representative of a location of a load being transported for the first freight transportation service. The confidence score can be represented as a number, decimal, fraction, percentage, etc. For instance, a confidence score of 0.9 can be associated with a strong probability that a location dataset and particular service instance are correctly matched. Whereas, a confidence score of 0.1 can be associated with a low probability that a location dataset and a particular instance are correctly matched.

By way of example, FIG. 8A depicts a graphical representation of location data associated with a vehicle traveling along path 735 (e.g., as depicted in FIG. 7B). Graphical depiction 800 depicts location data obtained from a computing source associated with a vehicle. The location data can include, for example, GPS location data. As depicted in FIG. 8, the graphical representation can include indications associated with geofence 1 (e.g., geofence 1 720, geofence 2 725, and geofence 3 730). In some implementations, graphical depiction 800 can represent an expected signal pattern associated with facility 715. By way of example, the expected signal pattern can include a plurality of data points associated with an expected travel path indicative of a road traversed to arrive at the location associated with the first freight transportation service. For example, graphical depiction can include several geofence crossing points (e.g., indicative of travel across points 735A-K). Graphical depiction 800 can include features similar to FIG. 6. For example, graphical depiction 800 can include an approach portion 805, a dwelling portion 810, and departure portion 815.

Graphical depiction 800 can include a plurality of location data points associated with a plurality of computing sources. For example, the graphical depiction contains two data points associated with source 820, nine data points associated with source 825, fourteen data points associated with source 830, and five data points associated with source 835. In some implementations, source 820 can be associated with carrier device data (e.g., from freight carrier device system 206) indicative of a manually entered arrival and departure time associated with a carrier.

Source 825 can be an electronic logging device. For example, the electronic logging device can obtain location data (e.g., via GPS pings) at a regular interval. However, due to the sparse nature of the pings, an ELI) can change location from outside geofence 725 to arriving at the location of the facility without the computing system obtaining data indicative of passing geofence 725 and geofence 720.

Source 830 can be associated with a GPS component of a user device. For example, a user may consent to transmitting data indicative of location to the freight service provider to facilitate tracking the freight service instance. The GPS component of the user device can, for example, provide GPS pings more frequently than source 825. Due to the more frequent GPS pings, the computing system has more data points to compare to the expected signal pattern.

In some implementations, source 835 can be associated with a GPS associated with an ELD of a trailer. For example, the ELI) of the trailer may have a different level of precision that source 820, 825, and 830. Therefore, the GPS pings associated with source 835 can be further away from the expected signal pattern than the data points of the other sources that are depicted in graphical depiction 800.

In some implementations, confidence scores can be calculated based on an analysis of current location datasets and/or prior location datasets. For example, a confidence score can be determined based on a level of agreement between the plurality of computing sources (and weighted based on the respective computing source's trust scores). In some implementations, the computing system can obtain assigned trust scores for the plurality of computing sources A confidence score can be determined by obtaining a sum of trust for each respective computing source and determining an aggregate sum of trust for the computing sources. A confidence score can be determined using the following function:

$$\text{confidence(source)} = \frac{\text{sum of trust(source)}}{\text{sum of trust(all)}}$$

By way of example, there can be three computing sources. Each computing source can have an associated trust score. For example, a computing source can be associated with a plurality of location datapoints. A trust score can be determined for each respective point of the set of location datapoints. For example, the trust scores can be determined based on a comparison of the data points to other expected datapoints, historical datapoints, datapoints of other computing sources, etc. The trust scores for each respective datapoint for a particular computing source can be summed to determine the trust score (e.g., sum of trust(source)) for a particular source. For illustrative purposes, the sum of trust scores can be as follows.

sum of trust (source one)=4.325
sum of trust (source two)=3.57
sum of trust (source three)=0.653

The sum of trust (all)=sum of trust (source one)+sum of trust (source two) 4+sum of trust (source three). For this example, the sum of trust equals 8.548. Using the above confidence score formula, the respective confidence scores can be determined as follows:

$$\text{confidence(source one)} = \frac{4.325}{8.548} = 0.50597$$
$$\text{confidence(source two)} = \frac{3.57}{8.548} = 0.41764$$
$$\text{confidence(source three)} = \frac{0.653}{8.548} = 0.07639$$

Additionally, or alternatively, a confidence score can be determined by one or more machine learned models. A confidence score can represent a likelihood that a computing source is correct. For example, the confidence score can be representative of confidence that a computing source is associated with a specific freight service instance (e.g., an active service instance).

FIG. 8B depicts example confidence scores determined for the respective computing sources (sources 820, 825, 830, 835). For example, source 820 can have a confidence score of 0.65, source 825 can have a confidence score of 0.85, source 830 can have a confidence score of 0.95, and source 835 can have a confidence score of 0.50. Looking at the graphical representation in FIG. 8A it is reasonable to confirm that the sources associated with lower confidence scores have less data points that align with the expected signal pattern for a particular facility. Many processes can be performed to determine the confidence score associated with each respective computing source. The finalized confidence scores can be used to prioritize the sources and determine a primary source.

Confidence scores can be represented as a floating number between 0 and 1. A confidence score below 0.3 can indicate that the computing source is not a reliable computing source. A confidence score between 0.3 and 0.7 can indicate that the computing source is somewhat likely to be associated with a particular service instance. A confidence score between 0.7 and 1 can indicate that the computing source is likely associated with the particular service instance.

At (508), method 500 can include determining, from among the plurality of location datasets, a primary location dataset for representation of the location of the load being transported for the first freight transportation service based on the respective confidence scores for the plurality of location datasets. For instance, a computing system (e.g., an operations computing system associated with a service entity) can determine, from among the plurality of location datasets, a primary location dataset for representation of the location of the load being transported for the first freight transportation service based on the respective confidence scores for the plurality of location datasets. As described herein, a first location dataset associated with a first computing source can have a confidence score of 0.5 whereas a second location dataset associated with a second computing source can have a confidence score of 0.7. In response to comparing the two confidence scores, the computing system can determine that the second computing source with the higher confidence score of 0.7 is the primary location dataset. By way of example, source 830 in FIG. 8B has a confidence score of 0.95 compared to the other sources with lower confidence scores (e.g., source 820 with a confidence score of 0.65, source 825 with a confidence score of 0.85, and source 835 with a confidence score of 0.5). The computing system can determine that source 830 is the primary location dataset based on having the highest confidence score of the set of location datasets.

At (510), method 500 can include performing one or more actions associated with the first freight transportation service based on the primary location dataset. For instance, a computing system (e.g., an operations computing system associated with a service entity) can perform one or more actions associated with the first freight transportation service based on the primary location dataset. As described herein, the actions can include (i) tracking a progress of the load for the first freight transportation service; (ii) updating an estimated time of arrival for the load; (iii) adjusting a risk model; (iv) updating a status associated with the first freight transportation service; (v) outputting a notification indicative of the status for display via a user device; (vi) determining a performance of the freight carrier; (vii) determining a compensation value for the freight carrier; or (viii) retraining a machine-learned model trained to determine the respective confidence score.

By way of example, tracking a progress of the load for the first freight transportation service can include determining that a first computing source is the primary computing source and then regularly obtaining data from the first computing source indicative of timing/location pairs. For example, the first computing source can be associated with GPS ping data. In response to determining the first computing source is the primary computing source, the system can obtain data from the primary computing source indicative of locations and use that data to update statuses associated with the particular service instance (e.g., arrival, departure, ETA, etc.).

In some implementations, the method can include matching obtained location data from a variety of computing sources to graphical depictions of expected travel signals. Matching can be done in a variety of ways. For example, matching can be performed via matching heuristics or machine learning models. Matching heuristics can include location-based matching (e.g., as described in FIG. 9). Matching can include recording GPS trajectories to determine if location data associated with a computing source is a source associated with a particular freight service instance.

Figure 9:
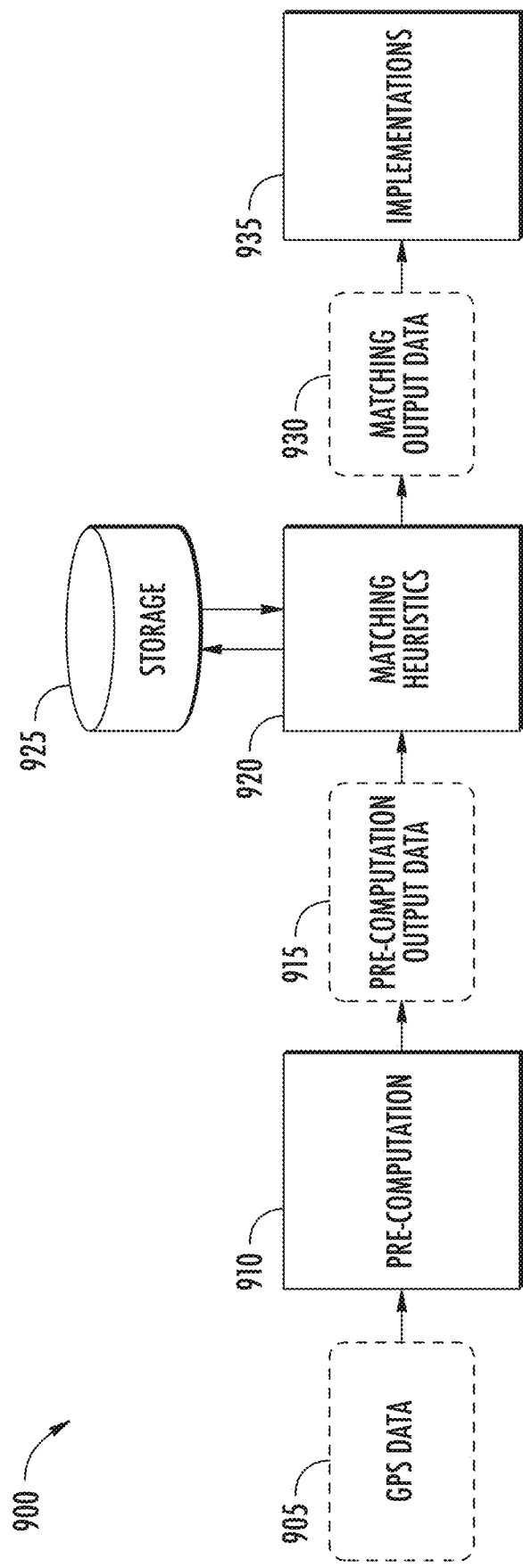
FIG. 9 depicts a diagram of an example data flow according to aspects of the present disclosure.

FIG. 9 depicts a block diagram of example dataflow 900 for location-based matching. The dataflow 900 represents the flow of data/information through computing system(s) as certain example operations are performed in accordance with the present disclosure. For example, dataflow 900 can include obtaining GPS data 905 and performing pre-computation 910. In some implementations, at pre-computation 910, a computing system can ingest GPS data 905 as input and use carrier information to fetch all active facilities (e.g., facilities associated with particular service instances). Based on the active facilities, the computing system can utilize a linked data structure (e.g., a look-up table, data map, graph, etc.) to access data associated with those facilities and, thus, associated service instances. This data can include pre-computed output data 915. Pre-computed output data 915 from pre-computation 910 can include GPS data, facility location data, timing/location pairs, or other data associated with one or more active service instances.

At 920 matching heuristics/models can be performed. For example, pre-computed output data 915 can processed by a computing system using certain heuristics or models. Matching output data 930 can include data indicative of one or more computing devices (and associated location data) with a particular freight service instance, or other data (e.g., as described in FIG. 4, as described within the present disclosure). This can include, for example, confidence scores or an identified primary location dataset, as described herein.

For example, matching heuristic algorithms/rules can be performed to associate pre-computing output data 915 with a particular active service instance (e.g., load). For example, heuristics can be performed to match the pre-computation output data 915 with a particular active service instance. The heuristic rules can be based on historical data/matching that compares location data (e.g., coordinates, distance to reference point, etc.) and time stamps/steps to that of a reference dataset. Matching heuristics can process data from a plurality of sources and emit a matching computing source (e.g., device) with a particular active service instance (e.g., active freight load, load).

In some implementations, one or more models can be trained to perform matching for load analysis. For example, the models can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the computing system can include one or more models to perform matching for load analysis.

In some implementations, the computing system can obtain the one or more models using communication interface(s) to communicate with the second computing system over the network(s). For instance, the computing system can store the model(s) (e.g., one or more machine-learned models) in the memory. The computing system can then use or otherwise implement the models (e.g., by the processors). By way of example, the computing system can implement the model(s) perform matching for load analysis.

In some implementations, the computing system can train one or more machine-learned models of the model(s) through the use of one or more model trainers and training data. The model trainer(s) can train any one of the model(s) using one or more training or learning algorithms. One example training technique is backwards propagation of errors. In some implementations, the model trainer(s) can perform supervised training techniques using labeled training data. In other implementations, the model trainer(s) can perform unsupervised training techniques using unlabeled training data. In some implementations, the training data can include simulated training data (e.g., training data obtained from simulated scenarios, inputs, configurations, environments, data from data store 925 etc.). In some implementations, the computing system can implement simulations for obtaining the training data or for implementing the model trainer(s) for training or testing the model(s). By way of example, the model trainer(s) can train one or more components of a machine-learned model to perform matching for load analysis through unsupervised training techniques using an objective function (e.g., costs, rewards, heuristics, constraints, etc.). In some implementations, the model trainer(s) can perform a number of generalization techniques to improve the generalization capability of the model(s) being trained. Generalization techniques include weight decays, dropouts, or other techniques.

In some embodiments, matching heuristics or models can be backed by data store 925. Data store 925 can support stateful processing. In some instances, matching heuristics/models can obtain or send data from/to data store 925. Data from data store 925 can be used as input for matching heuristics/models 920 (e.g., a matching heuristics algorithm). Stateful stream processing can include implementations where a state (e.g., expected data value) can be shared between events. For example, a plurality of service instances can be performed for a service with a pickup location at facility A and a drop-off location at facility B. A state can be associated with an arrival or departure at facility A or B. By way of example, a first state can be an expected signal pattern associating with arriving, dwelling, and departing from facility A. Data store 925 can store data associated with the plurality of services instances (e.g., events) associated with the first state. As matching heuristics/algorithm obtains additional information for new service instances (e.g., events), the past state data can be used to update processing of new service instances. As the new service instances are processed, they can be saved in data store 925. In some implementations, new service instances can be used to further update the matching heuristics/model 920.

In some implementations, location data points from a particular computing device will not be repeatedly flagged as a new computing source to match. For example, the system can determine that a GPS from a particular device will provide multiple location data points. The system can make an initial identification that the computing device (and associated GPS component) are a potential computing source to match. As the computing system continually obtains updated location data points from the computing device (and associated GPS component), the computing system can add this data to the particular computing device and not flag the incoming data points as being associated with new (or unidentified) computing source to match.

In some implementations, the matching heuristics or models can programmatically analyze geofence ingress/egress activity recorded for timing/location pairs for a particular computing device. For example, a computing system can use the heuristics/models to determine that a single computing device has a location dataset indicative of a crossing a geofence during a particular time. In response, computing system can match the computing source with the particular service instance, as described herein.

Location-based matching can include recording GPS trajectories to determine if location data associated with a computing source is a source associated with a particular service instance. In some implementations, the matching can include programmable logic arrays (PLA) matching heuristics. For PLA matching heuristics, the computing system can begin logging PLA output session data X hours before an appointment time (e.g., associated with an active service instance) for all computing devices associated with a carrier. At Y hours before the appointment time, the computing system can determine the PLA for each computing device relative to the appointment (e.g., active service instance). The computing system can associate the particular service instance (e.g., load) with the computing device with the lowest PLA prediction below a cut-off threshold. For example, a cut-off threshold can be used to reduce the number of computing devices that must be processed. For example, PLA output can include a location data (e.g., indicative of a distance of a computing device to a facility). The cut-off threshold can be a set distance away from the facility. For example, the cut-off threshold can be set to 25 miles away from the facility. Thus, at time Y before an appointment, the system can remove computing devices located more than 25 miles away from the facility. The cut-off threshold can be set by a user (e.g., for a specified distance) or can be calculated (e.g., based on population density associated with an area surrounding a facility).

PLA matching heuristics can provide for more efficient processing and bandwidth usage. For example, a computing system (e.g., operations computing system 120), can conserve processing resources by transmitting and processing a smaller number of datasets. Thus computing resources can be used for other processing needs.

Additionally, or alternatively, matching can include source geo matching heuristics. This can include determining if there are one or more devices within a specific distance of a facility for X time before an appointment start and Y time after an appointment ends. For example, an appointment can include a pick-up or drop-off time associated with a particular service instance. In some implementations, the system can determine that only one computing source (e.g., device) has location data indicative of an arrival at. In response, the system can determine that the one device is a match for the particular service instance. In some implementations, the system can determine a plurality of computing sources (e.g., devices) fit the criteria. In response, the system can decline to match any devices with the particular service instance.

The matching heuristics/models 920 can output matching output data 930 to be used in a plurality of implementations 935. As described herein, the implementations 935 can include, for example at least one of: at least one of (i) tracking a progress of the load for the first freight transportation service; (ii) updating an estimated time of arrival for the load; (iii) adjusting a risk model; (iv) updating a status associated with the first freight transportation service; (v) outputting a notification indicative of the status for display via a user device; (vi) determining a performance of the freight carrier; (vii) determining a compensation value for the freight carrier; or (viii) retraining a machine-learned model trained to determine the respective confidence score.

The technology of the present disclosure can also, or alternatively, be used to help identity or correct the stored location of a facility (e.g., a warehouse with loading dock) associated with transporting freight loads.

For example, FIG. 10 depicts example geographic area 1000 comprising a plurality of location data points (e.g., indicative of GPS signals). Geographic area 1000 can include an area 1005 that includes a high number (or high density) location data points (e.g., GPS pings), a location 1010, and a geofence 1015 with a set radius.

In some implementations, manually recorded facility locations can be incorrectly identified. For example, location 1010 can be a location previously identified as facility location. However, the high density of the location data points indicate a concentration of activity around/within area 1005. This may occur, for example, in the event that carriers are parked, travelling around, etc. a shipping facility in that area. Thus, it may be that the facility is actually located about half a mile away from the previously identified location 1010. Based on traditional geofences, e.g., of a set radius, having an incorrect facility location can cause incorrect triggers due to obtaining data indicative of a vehicle crossing a geofence 1015. This could result in improper status updates to carriers, service providers, consumers, etc.

A computing system (e.g., operations computing system 120, etc.) can use location data obtained from computing sources (e.g., from prior trips) to determine a correct facility location. For example, the computing system can obtain the location data points shown in FIG. 10 and determine a pattern or density of location data points. This can include determining whether a threshold number of location data points are within a threshold distance/time of one another to represent a cluster. In the event that the computing system determines that a cluster does exist, the computing system can update a data store that records the location of the associated facility to indicate the location of the facility in accordance with the cluster. If the computing system does not have a high enough confidence level that the cluster may represent a location of a facility (e.g., due to a sparsity of data points, inconsistencies with historical data, potential external factors like temporary changes in traffic patterns, etc.), the computing system can continue to monitor acquired location data points (e.g., GPS pings) from one or more computing sources/devices until a high enough confidence level (e.g., based on a threshold number of data points over a given time) is reached to identify the cluster location as a location of a facility.

In some implementations, the technology of the present disclosure can be utilized to generate customized geofences for certain facilities.

Figure 11:
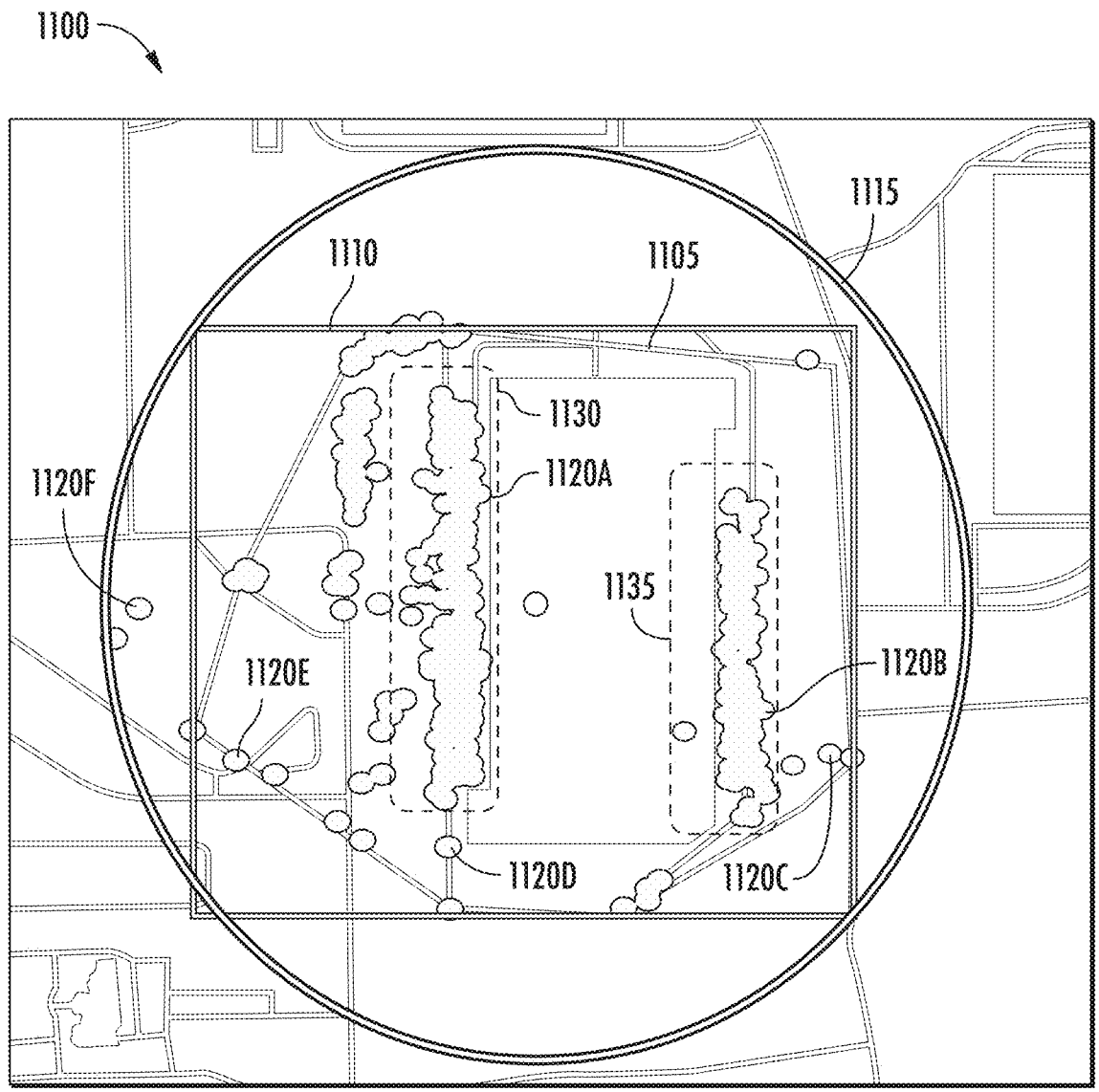
FIG. 11 depicts an example of an automatically generated geofence based on plotting clusters according to aspects of the present disclosure.

For example, FIG. 11 includes a geographic area 1100. The geographic area 1100 can include customized geofence 1105, example square geofence 1110, example circle geofence 1115, and a plurality of location data points (e.g., 1120A-F). For example, the system can obtain location data from a plurality of computing sources and known particular service instances.

For example, in these instances a set shape, set radius, etc. may not correctly identify the locations associated with a pick-up or drop-off facility. A computing system can perform operations including automatically generating a customized geofence for the location associated with the first freight transportation service (e.g., facility). For example, the computing system can obtain data indicative of a geographical radius associated with first freight transportation service (e.g., a first facility). The computing system can determine a density of a plurality of locations within the geographical radius. For example, the density can be indicative of a number of GPS pings at a respective location of the plurality of locations within the geographical radius during a time period. The computing system can determine that the density of the plurality of locations is above a threshold density. For example, the plurality of locations can include location 1130, location 1135, etc. The computing system can determine that the density of a first location of the plurality of locations is above a threshold density. The computing system can generate, in response to determining that the density of the first location of the plurality of location is above the threshold density, a geofence encompassing at least the first location of the plurality of locations (e.g., geofence 1105). The computing system can generate, in response to determining that the density of the first location of the plurality of locations is above a threshold density, a geofence encompassing at least the first location of the plurality of locations. For example, first location can be represented by location 1130.

In some implementations, automatically generating the customized geofence for the location associated with the first freight transportation service can include determining that the density of a second location of the plurality of locations is above a threshold density. The computing system can generate, in response to determining that the density of the second location of the plurality of locations is above the threshold density, a geofence encompassing at least the first location and the second location. For example, a second location can be represented by location 1135. The generated geofence can be represented by geofence 1105. The system can use the customized geofence as the location associated with the first freight transportation service (e.g., for calculations for distances).

Figure 12:
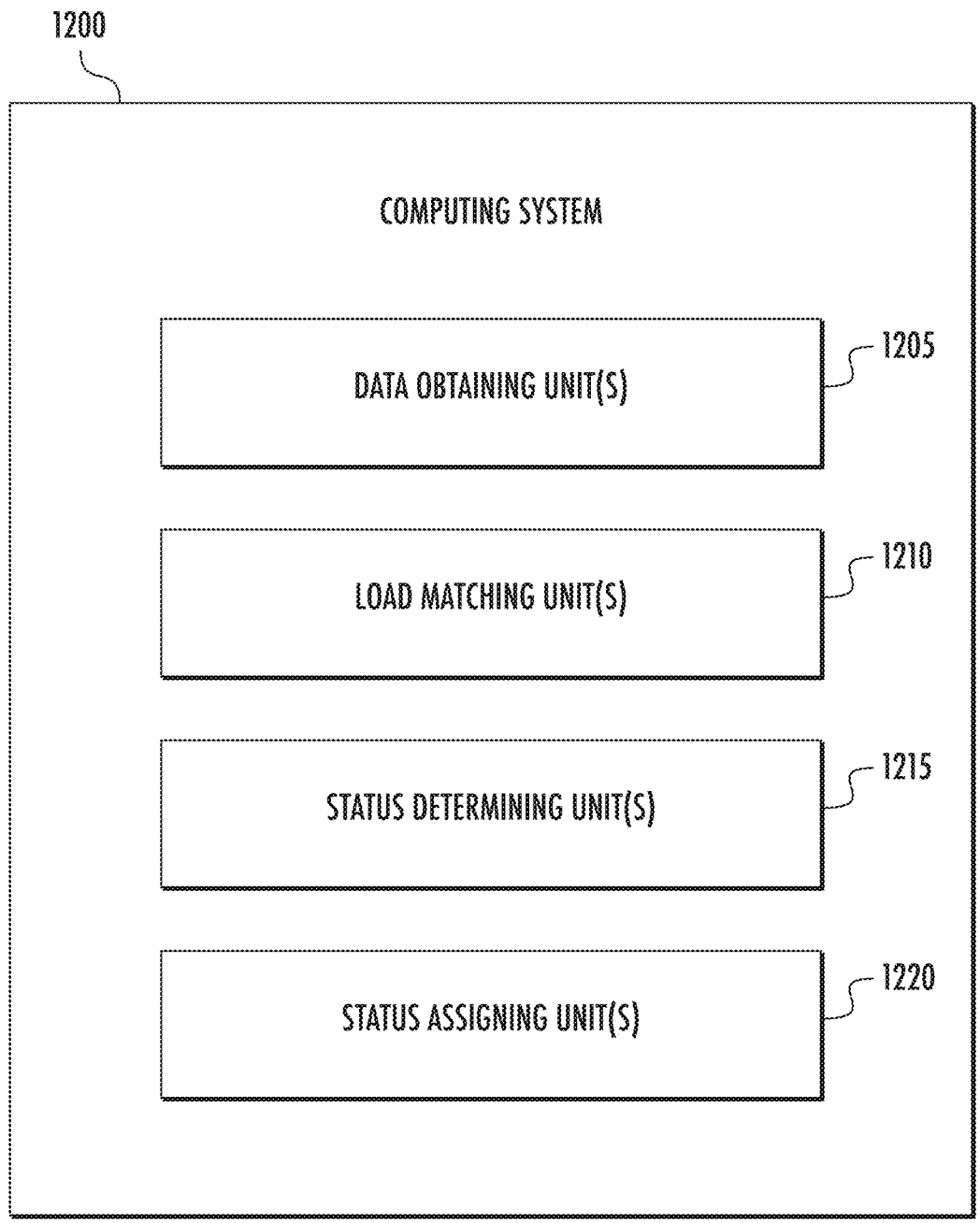
FIGS. 12-13 depict block diagrams of systems according to aspects of the present disclosure.

FIG. 12 depicts a block diagram of an example computing system 1200 for programmatically tracking a load by associating data from various computing sources with specific loads based on aggregating and analyzing device signals according to example implementations of the present disclosure. Various means can be configured to perform the methods and processes described herein. FIG. 12 depicts example units associated with a computing system for performing operations and functions according to example embodiments of the present disclosure. As depicted, FIG. 12 depicts a computing system 1200 that can include, but is not limited to, data obtaining unit(s) 1205; load matching unit(s) 1210; status determining unit(s) 1215; status assigning unit(s) 1220; or load tendering unit(s) 1225.

In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), or other suitable hardware. The means can be programmed to perform one or more algorithms for carrying out the operations and functions described herein.

The means can be configured to obtain load data descriptive of one or more load attributes of a load managed by an operations computing system, wherein the operations computing system is configured to advance the load through a plurality of statuses indicative of a relationship between values of the one or more load attributes and a respective status of the plurality of statuses. A data obtaining unit 1205 is one example of a means for obtaining load data (e.g., service instance data) descriptive of one or more load attributes of a load managed by an operations computing system according to example aspects of the present disclosure.

The means can be configured to matching the one or more load attributes (e.g., associated with a particular service instance) to one or more location datasets associated with computing sources. A load matching unit 1210 is one example of a means for programmatically tracking a load by associating data from various computing sources with specific loads based on aggregating and analyzing device signals according to example aspects of the present disclosure.

The means can be configured to, based on the comparison of the one or more load attributes to the one or more status attribute criteria, determine an appropriate status of the plurality of statuses for the load. A status determining unit 1215 is one example of a means for determining an appropriate status of the plurality of statuses for the load based on associating data from the various computing sources with specific loads based on aggregating and analyzing device signals according to example aspects of the present disclosure.

The means can be configured to assign the appropriate status to the load in the operations computing system. Assigning the appropriate status to the load can include storing, in a load status data store, the appropriate status of the load. A status assigning unit 1220 is one example of a means for assigning the appropriate status to the load in the operations computing system according to example aspects of the present disclosure.

Figure 13:
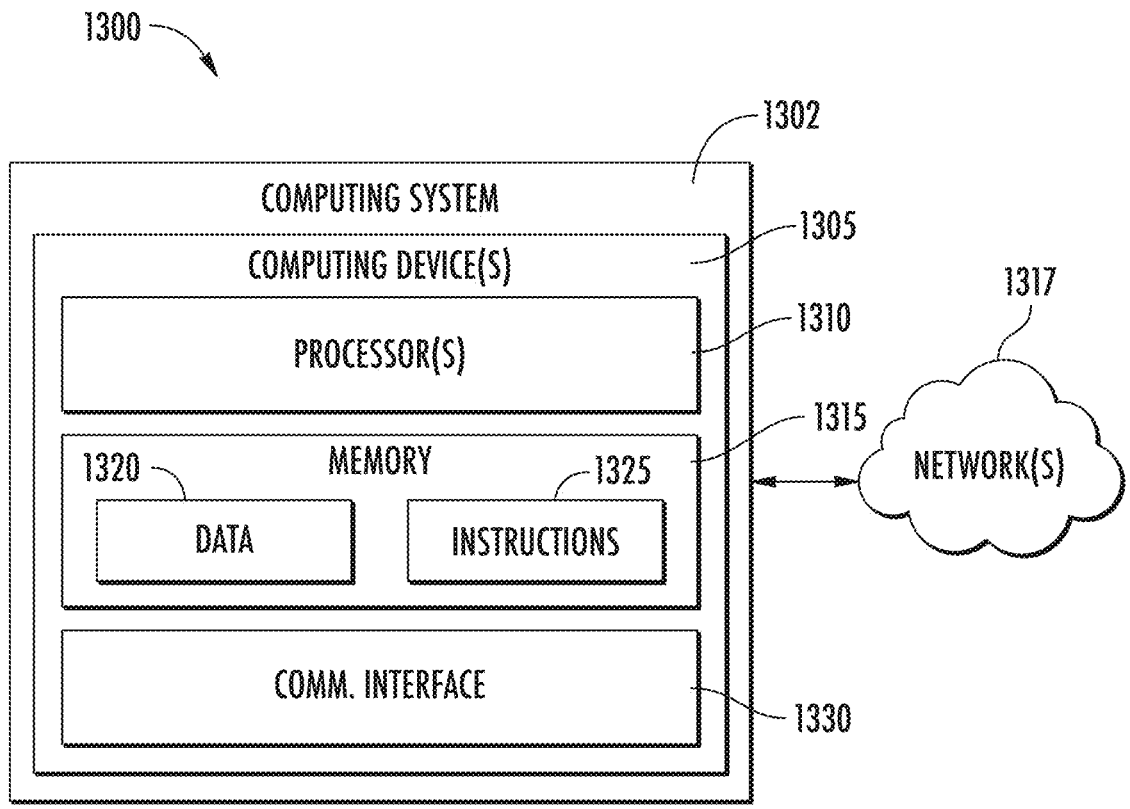

FIG. 13 depicts a block diagram of an example computing system 1300 according to example embodiments of the present disclosure. The example computing system 1300 includes a computing system 1302 that can be communicatively coupled to one or more remote computing systems (not illustrated) over one or more networks 1317.

The computing system 1302 can include computing device(s) 1305. Computing system 1302 can include one or more processors 1310 and a memory 1315. The one or more processors 1310 can be any suitable processing device (e.g., a processor core, a microprocessor, an ASIC, a FPGA, a controller, a microcontroller, etc.) and can be one processor or a plurality of processors that are operatively connected. The memory 1315 can include one or more non-transitory computer-readable storage media, such as RAM, ROM, EEPROM, EPROM, one or more memory devices, flash memory devices, etc., and combinations thereof.

The memory 1315 can store information that can be accessed by the one or more processors 1310. For instance, the memory 1315 (e.g., one or more non-transitory computer-readable storage mediums, memory devices) can store data 1320 that can be obtained, received, accessed, written, manipulated, created, or stored. The data 1320 can include, for instance, data such as location datasets from a plurality of computing sources, GPS signals, manually recorded times, geofence break indicators (e.g., when a monitored device enters or exits a geofence, or crosses a geofence boundary etc. as described herein. In some implementations, the computing system 1302 can obtain data from one or more memory devices that are remote from the computing system 1302.

The memory 1315 can also store computer-readable instructions 1325 that can be executed by the one or more processors 1310. The instructions 1325 can be software written in any suitable programming language or can be implemented in hardware. Additionally, or alternatively, the instructions 1325 can be executed in logically or virtually separate threads on processor(s) 1310.

For example, the memory 1315 can store instructions 1325 that when executed by the one or more processors 1310 cause the one or more processors 1310 (the computing system) to perform any of the operations or functions described herein, including, for example, obtaining load data descriptive of one or more load attributes of a load managed by an operations computing system, wherein the operations computing system is configured to advance the load through a plurality of statuses indicative of a relationship between values of the one or more load attributes and a respective status of the plurality of statuses; comparing the one or more load attributes to one or more status attribute criteria respective to the plurality of statuses; based on the comparison of the one or more load attributes to the one or more status attribute criteria, determining an appropriate status of the plurality of statuses for the load; and assigning the appropriate status to the load in the operations computing system.

The computing system 1302 can include a communication interface 1330. The communication interface 1330 can be used to communicate with one or more systems or devices, including systems or devices that are remotely located from the computing system 1302. A communication interface 1330 can include any circuits, components, software, etc. for communicating with one or more networks (e.g., 1317). In some implementations, a communication interface 1330 can include, for example, one or more of a communications controller, receiver, transceiver, transmitter, port, conductors, software or hardware for communicating data.

The network(s) 1317 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1317 can be accomplished, for instance, via a network interface using any type of protocol, protection scheme, encoding, format, packaging, etc.

FIG. 13 illustrates one example computing system 1300 that can be used to implement the present disclosure. Other computing systems can be used as well. In addition, components illustrated or discussed as being included in one of the computing systems 1302 can instead be included in any other suitable computing system. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art.

Terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

What is claimed is:

1. A computing system, comprising:
one or more processors; and
one or more non-transitory, computer-readable media storing instructions that are executable by the one or more processors to cause the computing system to perform operations, the operations comprising:
obtaining a plurality of location datasets from a plurality of computing sources, wherein a respective location dataset is indicative of a location of a freight carrier at different instances of time;
determining, for the freight carrier, an expected signal pattern for a location associated with a first freight transportation service;
for each respective computing source of the plurality of computing sources, generating a respective confidence score based on the expected signal pattern and the respective location dataset of the respective computing source, wherein the respective confidence score is indicative of a probability that the respective location dataset of the respective computing source is representative of a load location associated with a load being transported for the first freight transportation service;
determining, from among the plurality of location datasets, a primary location dataset for representation of the load location being transported for the first freight transportation service based on the respective confidence scores for the plurality of location datasets;
automatically generating a geofence for the location associated with the first freight transportation service by:
obtaining data indicative of a geographical radius associated with the location associated with the first freight transportation service;
determining a density of a plurality of locations within the geographical radius, wherein the density is indicative of a number of GPS pings at a respective location of the plurality of locations within the geographical radius during a time period;

determining that the density of a first location of the plurality of locations is above a threshold density; and generating, in response to determining that the density of the first location of the plurality of locations is above the threshold density, the geofence encompassing at least the first location of the plurality of locations; and performing one or more actions associated with the first freight transportation service based on the primary location dataset and the geofence.

2. The computing system of claim 1, wherein generating, for a respective computing source, the respective confidence score based on the expected signal pattern and the respective location dataset comprises:

generating the respective confidence score using a machine-learned model trained to output the probability that the respective location dataset of the respective computing source is representative of the load location associated with a load being transported for the first freight transportation service.

3. The computing system of claim 2, wherein the machine-learned model comprises a plurality of input layers, each input layer being associated with a different location dataset of a computing source.

4. The computing system of claim 2, wherein the machine-learned model is a gradient boosted tree model.

5. The computing system of claim 1, wherein the one or more actions associated with the first freight transportation service comprises:

determining, based on the primary location dataset for the load, at least one of an in-time value or an out-time value for the location associated with the first freight transportation service.

6. The computing system of claim 1, wherein the one or more actions associated with the first freight transportation service comprises at least one of: (i) tracking a progress of the load for the first freight transportation service; (ii) updating an estimated time of arrival for the load; (iii) adjusting a risk model; (iv) updating a status associated with the first freight transportation service; (v) outputting a notification indicative of the status for display via a user device; (vi) determining a performance of the freight carrier; (vii) determining a compensation value for the freight carrier; or (viii) retraining a machine-learned model trained to determine the respective confidence score.

7. The computing system of claim 1, wherein the location associated with the first freight transportation service comprises a facility for pick-up or delivery of the load, and wherein determining the expected signal pattern comprises:

filtering the plurality of location datasets to a limited time period associated with an appointment time associated with the first freight transportation service;

filtering the plurality of location datasets to a limited geographical area associated with the facility; and determining the expected signal pattern based on the limited time period and the limited geographical area.

8. The computing system of claim 1, wherein the expected signal pattern is indicative of a distance and time relationship for at least one of: (i) approaching the location associated with the first freight transportation service; or (ii) leaving the location associated with the first freight transportation service.

9. The computing system of claim 1, wherein computing the respective confidence score comprises:

generating a comparison of the respective location dataset of the respective computing source associated with the freight carrier at the different instances of time with the expected signal pattern of the freight carrier; and determining the respective confidence score based on the comparison of the respective location dataset of the respective computing source associated with the freight carrier at the different instances of time with the expected signal pattern of the freight carrier.

10. The computing system of claim 1, wherein the computing sources comprise at least one of: (i) a mobile application, (ii) a freight carrier device, (iii) a third-party location service, or (iv) a carrier system.

11. The computing system of claim 1, wherein at least one respective location dataset comprises a plurality of GPS signals.

12. The computing system of claim 1, wherein the expected signal pattern comprises a plurality of data points associated with an expected travel path indicative of a road traversed to arrive at the location associated with the first freight transportation service.

13. The computing system of claim 1, wherein automatically generating the geofence for the location associated with the first freight transportation service comprises:

determining that the density of a second location of the plurality of locations is above a threshold density; and generating, in response to determining that the density of the second location of the plurality of locations is above the threshold density, the geofence encompassing at least the first location and the second location.

14. A computer-implemented method, performed by one or more processors, comprising:

obtaining a plurality of location datasets from a plurality of computing sources, wherein a respective location dataset is indicative of a location of a freight carrier at different instances of time;

determining, for the freight carrier, an expected signal pattern for a location associated with a first freight transportation service;

for each respective computing source of the plurality of computing sources, generating a respective confidence score based on the expected signal pattern and the respective location dataset of the respective computing source, wherein the respective confidence score is indicative of a probability that the respective location dataset of the respective computing source is representative of a load location associated with a load being transported for the first freight transportation service;

determining, from among the plurality of location datasets, a primary location dataset for representation of the load location being transported for the first freight transportation service based on the respective confidence scores for the plurality of location datasets;

automatically generating a geofence for the location associated with the first freight transportation service by:

obtaining data indicative of a geographical radius associated with the location associated with the first freight transportation service;

determining a density of a plurality of locations within the geographical radius, wherein the density is indicative of a number of GPS pings at a respective location of the plurality of locations within the geographical radius during a time period;

determining that the density of a first location of the plurality of locations is above a threshold density; and generating, in response to determining that the density of the first location of the plurality of locations is above the threshold density, the geofence encompassing at least the first location of the plurality of locations; and performing one or more actions associated with the first freight transportation service based on the primary location dataset and the geofence.

15. The computer-implemented method of claim 14, the one or more actions comprises at least one of (i) tracking a progress of the load for the first freight transportation service; (ii) updating an estimated time of arrival for the load; (iii) adjusting a risk model; (iv) updating a status associated with the first freight transportation service; (v) outputting a notification indicative of the status for display via a user device; (vi) determining a performance of the freight carrier; (vii) determining a compensation value for the freight carrier; or (viii) retraining a machine-learned model trained to determine the respective confidence score.

16. The computer-implemented method of claim 15, wherein updating the status associated with the first freight transportation service comprises:
generating, automatically, one or more status updates for the load being transported for the first freight transportation service; and
transmitting data which causes the one or more status updates for the load to be provided for display on one or more user devices.

17. The computer-implemented method of claim 15, wherein an output of the risk model comprises a probability that the load will arrive late to at least one of a pick-up or drop-off location.

18. The computer-implemented method of claim 14, wherein automatically generating the geofence for the location associated with the first freight transportation service comprises:
determining that the density of a second location of the plurality of locations is above a threshold density; and
generating, in response to determining that the density of the second location of the plurality of locations is above the threshold density, the geofence encompassing at least the first location and the second location.

19. One or more non-transitory computer readable media storing instructions that are executable by one or more processors to perform operations comprising:
obtaining a plurality of location datasets from a plurality of computing sources, wherein a respective location dataset is indicative of a location of a freight carrier at different instances of time;
determining, for the freight carrier, an expected signal pattern for a location associated with a first freight transportation service;
for each respective computing source of the plurality of computing sources, generating a respective confidence score based on the expected signal pattern and the respective location dataset of the respective computing source, wherein the respective confidence score is indicative of a probability that the respective location dataset of the respective computing source is representative of a load location associated with a load being transported for the first freight transportation service;
determining, from among the plurality of location datasets, a primary location dataset for representation of the load location being transported for the first freight transportation service based on the respective confidence scores for the plurality of location datasets;
automatically generating a geofence for the location associated with the first freight transportation service by:
obtaining data indicative of a geographical radius associated with the location associated with the first freight transportation service;
determining a density of a plurality of locations within the geographical radius, wherein the density is indicative of a number of GPS pings at a respective location of the plurality of locations within the geographical radius during a time period;
determining that the density of a first location of the plurality of locations is above a threshold density; and
generating, in response to determining that the density of the first location of the plurality of locations is above the threshold density, the geofence encompassing at least the first location of the plurality of locations; and
performing one or more actions associated with the first freight transportation service based on the primary location dataset and the geofence.

20. The one or more non-transitory computer readable media of claim 19, wherein automatically generating the geofence for the location associated with the first freight transportation service comprises:
determining that the density of a second location of the plurality of locations is above a threshold density; and
generating, in response to determining that the density of the second location of the plurality of locations is above the threshold density, the geofence encompassing at least the first location and the second location.

* * * * *